(12) United States Patent
Kudo et al.

(10) Patent No.: US 10,884,279 B2
(45) Date of Patent: Jan. 5, 2021

(54) LIQUID CRYSTAL DISPLAY DEVICE

(71) Applicants: Mitsubishi Electric Corporation, Tokyo (JP); GEOMATEC CO., LTD., Kanagawa (JP)

(72) Inventors: Yukihiro Kudo, Tokyo (JP); Takashi Miyayama, Tokyo (JP); Chihaya Miyoshi, Miyagi (JP)

(73) Assignees: Mitsubishi Electric Corporation, Tokyo (JP); GEOMATEC CO., LTD., Kanagawa (JP)

( * ) Notice: Subject to any disclaimer, the term of this patent is extended or adjusted under 35 U.S.C. 154(b) by 0 days.

(21) Appl. No.: 16/788,755

(22) Filed: Feb. 12, 2020

(65) Prior Publication Data

US 2020/0271984 A1  Aug. 27, 2020

(30) Foreign Application Priority Data

Feb. 21, 2019  (JP) ................................. 2019-029488

(51) Int. Cl.
*G02F 1/1335*  (2006.01)
*G02F 1/1333*  (2006.01)
*G02F 1/1343*  (2006.01)

(52) U.S. Cl.
CPC .. *G02F 1/133502* (2013.01); *G02F 1/133308* (2013.01); *G02F 1/133512* (2013.01);
(Continued)

(58) Field of Classification Search
None
See application file for complete search history.

(56) References Cited

U.S. PATENT DOCUMENTS

2008/0151152 A1* 6/2008 Yang ................ G02F 1/133502
349/106
2016/0133198 A1* 5/2016 Jeong ................ G02F 1/133502
345/212

(Continued)

FOREIGN PATENT DOCUMENTS

JP  2013-114086 A  6/2013
JP  2018-081158 A  5/2018

*Primary Examiner* — Ryan Crockett
(74) *Attorney, Agent, or Firm* — Studebaker & Brackett PC

(57) ABSTRACT

A laminated film is provided between a transparent conductive film and a counter substrate so that the laminated film is in contact with the transparent conductive film and the counter substrate. The laminated film includes a first low refractive index layer, a first high refractive index layer, a second low refractive index layer, and a second high refractive index layer. In the direction from the transparent conductive film toward the counter substrate, the first low refractive index layer, the first high refractive index layer, the second low refractive index layer, and the second high refractive index layer are provided to exist in order of the first low refractive index layer, the first high refractive index layer, the second low refractive index layer, and the second high refractive index layer. Each of the first low refractive index layer and the second low refractive index layer is made of a first material. The refractive index of light of the first material is in the range of 1.4 to 1.6. Each of the first high refractive index layer and the second high refractive index layer is made of a second material. The refractive index of light of the second material is in the range of 1.9 to 2.1.

5 Claims, 13 Drawing Sheets

(52) U.S. Cl.
CPC ............... *G02F 1/134363* (2013.01); *G02F 2001/133331* (2013.01); *G02F 2201/503* (2013.01); *G02F 2202/22* (2013.01); *G02F 2202/28* (2013.01); *G02F 2203/05* (2013.01)

(56) References Cited

U.S. PATENT DOCUMENTS

| | | | |
|---|---|---|---|
| 2017/0083136 A1* | 3/2017 | Kira | G06F 3/0412 |
| 2017/0136524 A1* | 5/2017 | Ederer | B22C 23/00 |
| 2018/0136524 A1 | 5/2018 | Ikegami et al. | |
| 2019/0285952 A1* | 9/2019 | Ikegami | G02F 1/133308 |

* cited by examiner

FIG. 4
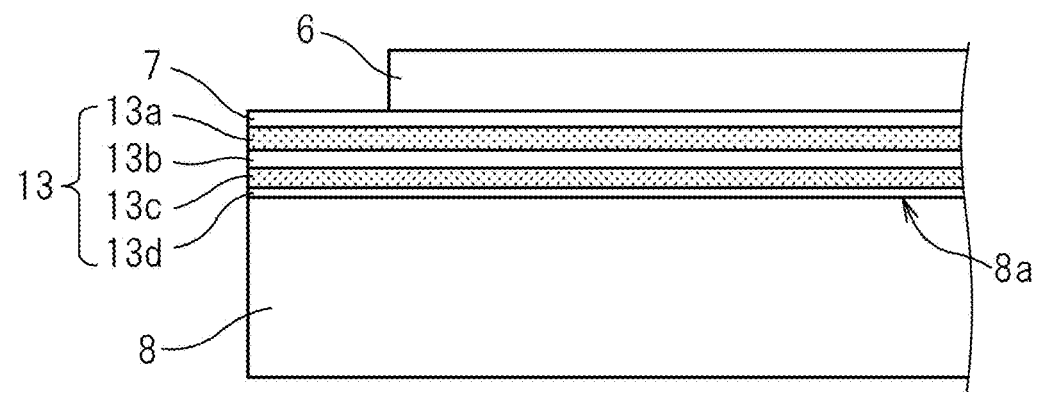
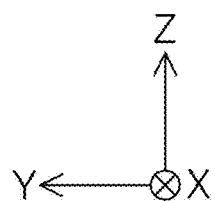

F I G. 5

Tb1

| | TRANSPARENT CONDUCTIVE FILM | | LOWER LAYER FILM a | | LOWER LAYER FILM b | | LOWER LAYER FILM c | | LOWER LAYER FILM d | | VISIBILITY |
|---|---|---|---|---|---|---|---|---|---|---|---|
| EXAMPLE 1 | ITO | 25nm | SiO$_2$ | 40nm | ITO | 40nm | SiO$_2$ | 40nm | ITO | 20nm | ○ |
| COMPARATIVE EXAMPLE 1 | ITO | 25nm | | | | | | | | | △ |
| COMPARATIVE EXAMPLE 2 | ITO | 25nm | SiO$_2$ | 40nm | ITO | 40nm | | | | | △ |
| COMPARATIVE EXAMPLE 3 | ITO | 25nm | SiO$_2$ | 40nm | Nb$_2$O$_5$ | 40nm | | | | | △ |

| | TRANSPARENT CONDUCTIVE FILM | | LOWER LAYER FILM a | | LOWER LAYER FILM b | | LOWER LAYER FILM c | | LOWER LAYER FILM d | |
|---|---|---|---|---|---|---|---|---|---|---|
| EXAMPLE 1 | ITO | 25nm | SiO$_2$ | 40nm | ITO | 40nm | SiO$_2$ | 40nm | ITO | 20nm |
| APPROXIMATE EXAMPLE a1 | ITO | 8nm | SiO$_2$ | 40nm | ITO | 40nm | SiO$_2$ | 40nm | ITO | 20nm |
| APPROXIMATE EXAMPLE a2 | ITO | 35nm | SiO$_2$ | 40nm | ITO | 40nm | SiO$_2$ | 40nm | ITO | 20nm |
| APPROXIMATE EXAMPLE b1 | ITO | 25nm | SiO$_2$ | 25nm | ITO | 40nm | SiO$_2$ | 40nm | ITO | 20nm |
| APPROXIMATE EXAMPLE b2 | ITO | 25nm | SiO$_2$ | 70nm | ITO | 40nm | SiO$_2$ | 40nm | ITO | 20nm |
| APPROXIMATE EXAMPLE c1 | ITO | 25nm | SiO$_2$ | 40nm | ITO | 20nm | SiO$_2$ | 40nm | ITO | 20nm |
| APPROXIMATE EXAMPLE c2 | ITO | 25nm | SiO$_2$ | 40nm | ITO | 85nm | SiO$_2$ | 40nm | ITO | 20nm |
| APPROXIMATE EXAMPLE d1 | ITO | 25nm | SiO$_2$ | 40nm | ITO | 40nm | SiO$_2$ | 10nm | ITO | 20nm |
| APPROXIMATE EXAMPLE d2 | ITO | 25nm | SiO$_2$ | 40nm | ITO | 40nm | SiO$_2$ | 65nm | ITO | 20nm |
| APPROXIMATE EXAMPLE e1 | ITO | 25nm | SiO$_2$ | 40nm | ITO | 40nm | SiO$_2$ | 40nm | ITO | 8nm |
| APPROXIMATE EXAMPLE e2 | ITO | 25nm | SiO$_2$ | 40nm | ITO | 40nm | SiO$_2$ | 40nm | ITO | 35nm |

F I G. 8
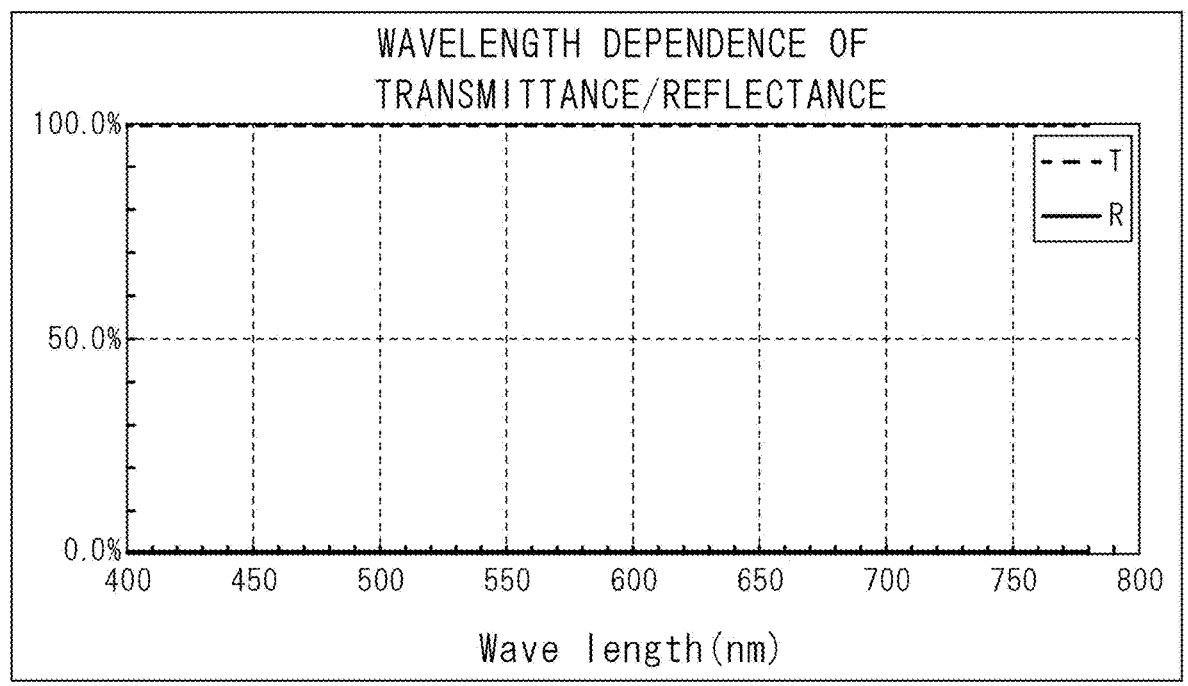

F I G. 1 2 A
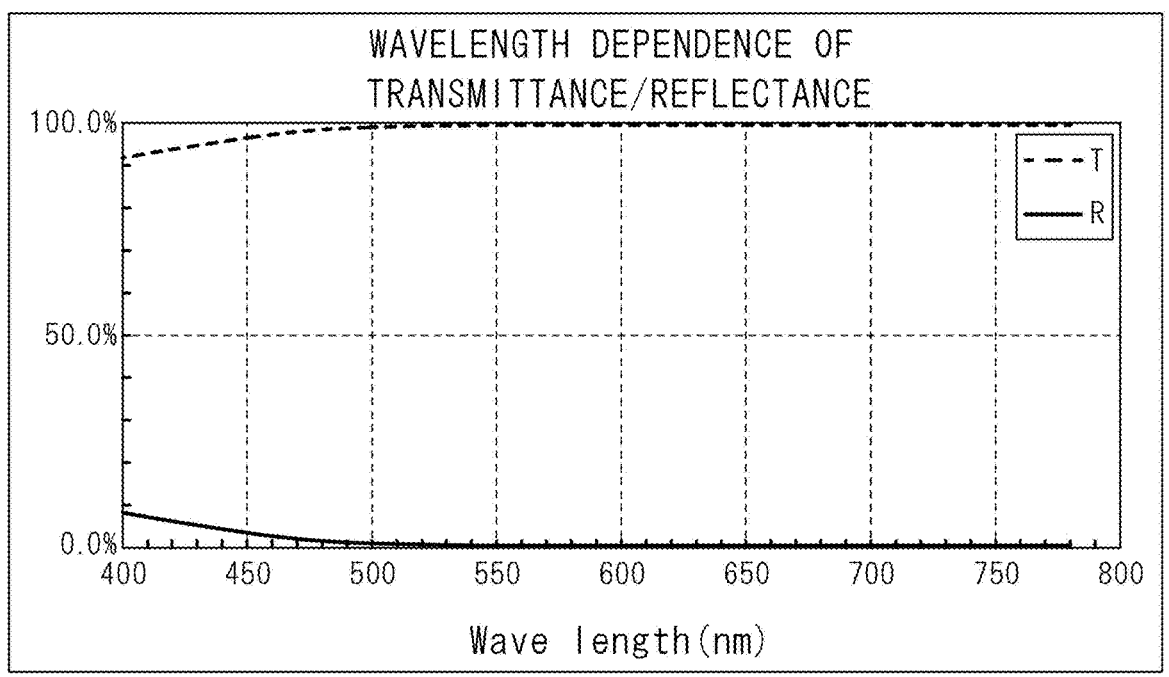
F I G. 1 2 B
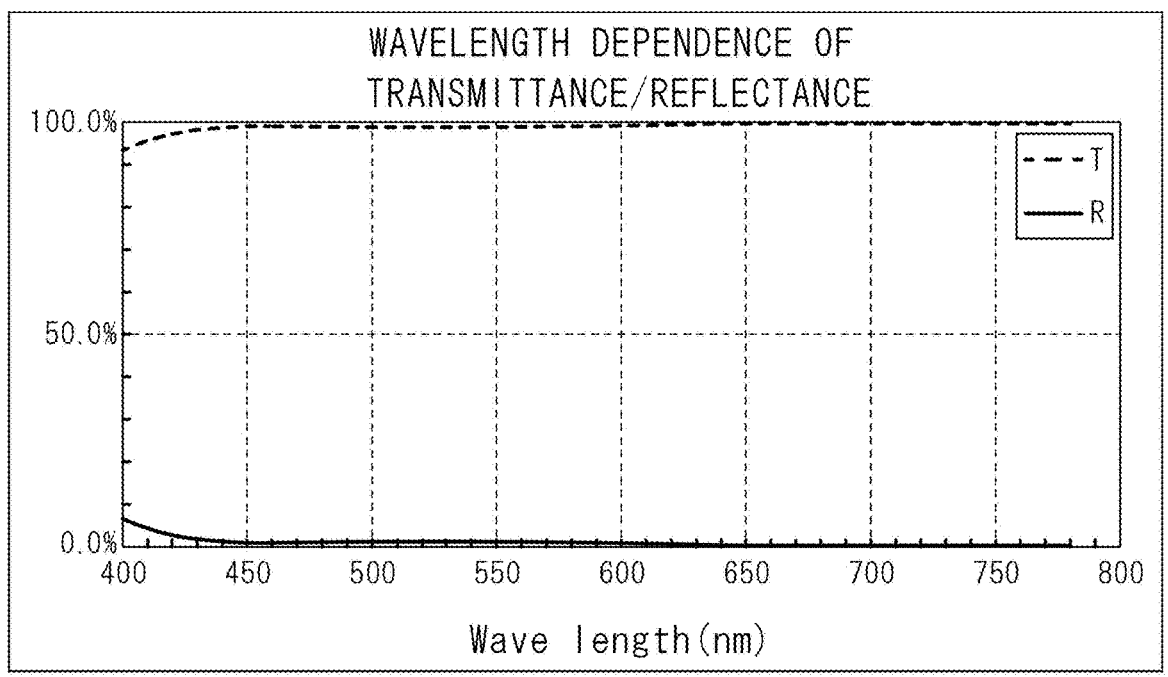

F I G. 1 3 A
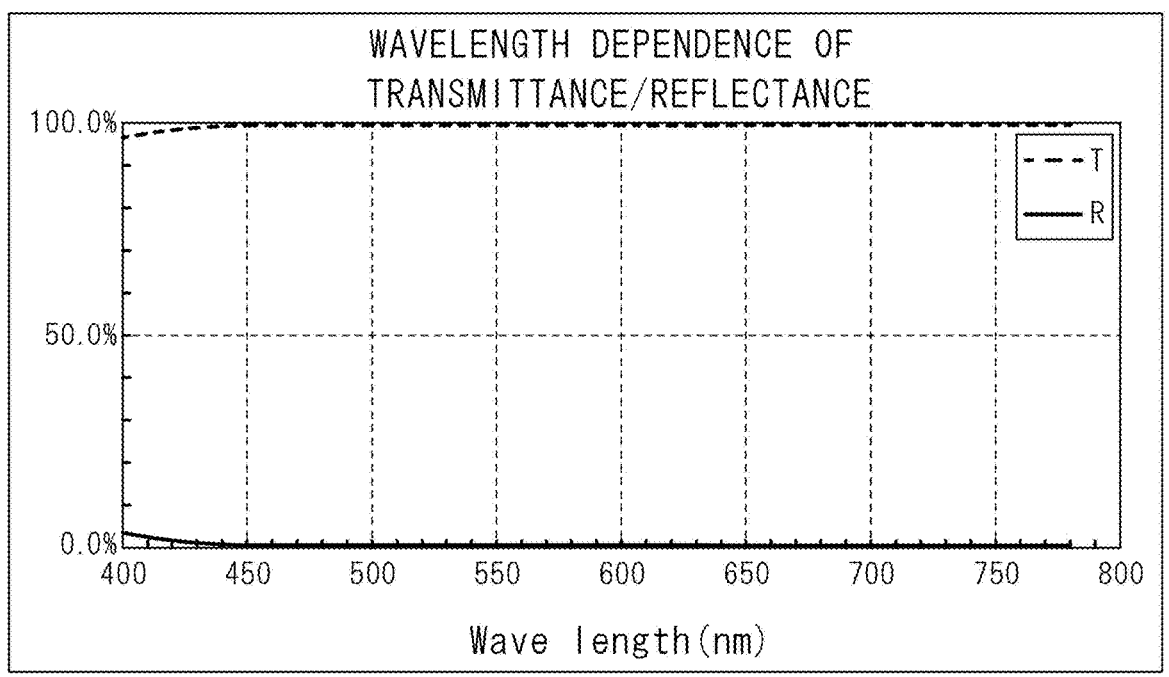
F I G. 1 3 B
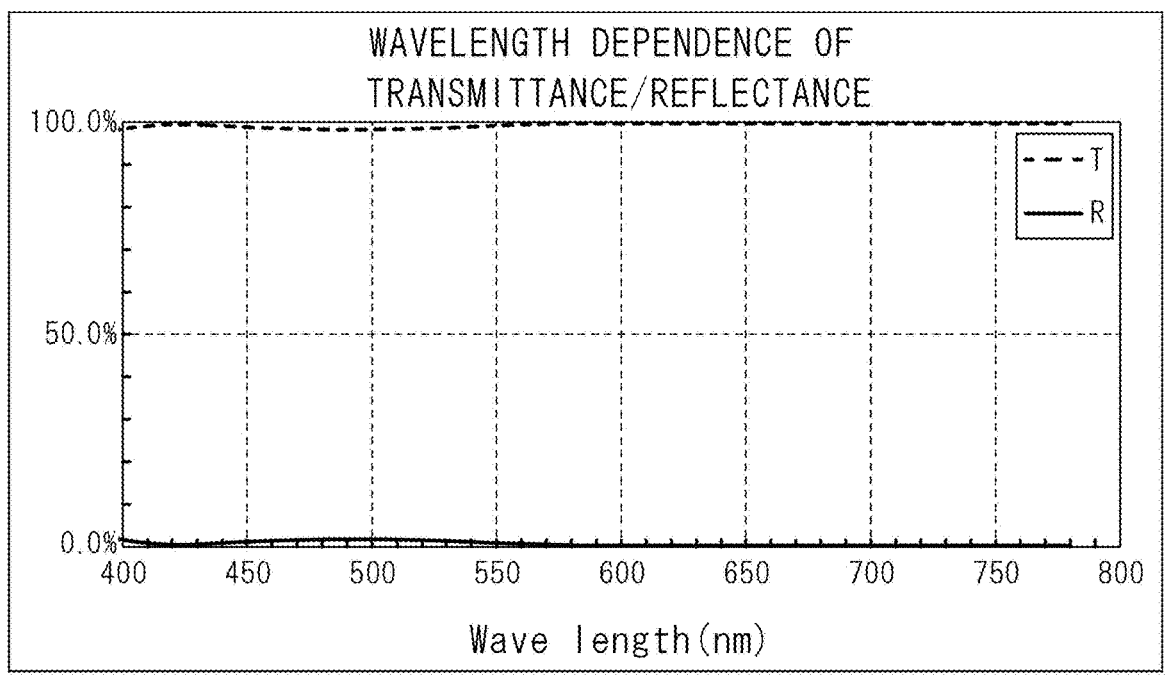

LIQUID CRYSTAL DISPLAY DEVICE

BACKGROUND OF THE INVENTION

Field of the Invention

The present invention relates to a liquid crystal display device having a configuration in which a transparent protective member provided with a light shielding film having an opening is stuck to the front surface of a liquid crystal panel of a lateral electric field drive system via a transparent adhesive material.

Description of the Background Art

In the liquid crystal panel of the lateral electric field drive system, a voltage is applied in a direction parallel to the main surface of the substrate. The liquid crystal display device of the lateral electric field drive system including the liquid crystal panel of the lateral electric field drive system includes an array substrate and a counter substrate. The array substrate is also referred to as a TFT substrate.

The array substrate is provided with a drive element such as a thin film transistor (TFT), and an electrode. The counter substrate is provided with a color filter or the like. The counter substrate is also referred to as a color filter (CF) substrate. It should be noted that the counter substrate is not provided with any electrode. Therefore, there is a problem that a malfunction occurs in the display of the liquid crystal panel due to the intrusion of an external electric field (static electricity) from the counter substrate side, the charge-up of the front surface of the counter substrate, and the like.

Thus, a liquid crystal display device of the conventional lateral electric field drive system has a configuration that suppresses intrusion of an external electric field from the counter substrate side in order to prevent electrostatic discharge (ESD). In the configuration, an indium tin oxide (ITO) film is formed on the front surface of the glass existing on the display surface side of the counter substrate. The display surface side of the counter substrate is the side opposite to the array substrate side of the counter substrate. The ITO film is functionally referred to as a "transparent conductive film". It should be noted that the ITO film is provided on the side of the back surface opposite to the surface on which the color filter is disposed of the counter substrate. Therefore, the ITO film is also referred to as "back surface ITO".

It should be noted that a polarizing plate is provided on the upper surface of the back surface ITO. In addition, under the back surface ITO, there is glass as a counter substrate. In this configuration, interface reflection occurs due to the difference in the refractive index of the polarizing plate, the refractive index of the back surface ITO, and the refractive index of the glass as the counter substrate. Therefore, there is a problem that the reflectance of a liquid crystal panel becomes high.

As main factors of the problem, reflection at the interface between the polarizing plate and the back surface ITO, reflection at the interface between the back surface ITO and the glass being the counter substrate, and the like can be considered. With these reflective elements, the reflectance of the liquid crystal display device including the back surface ITO is approximately twice as high as the reflectance of the liquid crystal display device not including the back surface ITO.

In addition, in recent years, for example, in a liquid crystal display device for outdoor installation, it has been necessary to protect the liquid crystal panel from external impacts and the like. Therefore, a transparent protective plate is provided on the front surface (display surface) side of the liquid crystal display device. The protective plate contains resin, glass, and the like. It should be noted that the protective plate is also referred to as "transparent protective member" or "cover glass".

It should be noted that in the situation where an air layer exists between the protective plate and the liquid crystal panel, the following phenomenon occurs. This phenomenon is a phenomenon in which external light incident from the front surface side of the liquid crystal display device is reflected by the front and back surfaces of the protective plate and the front surface of the liquid crystal panel. The occurrence of this phenomenon causes a problem that the visibility of the display on the liquid crystal panel is lowered.

Thus, the following configuration is adopted for an outdoor liquid crystal display device. The configuration is a configuration in which transparent resin is filled between a protective plate and a liquid crystal panel, for example. In addition, the configuration is a configuration of bonding a protective plate and a liquid crystal panel with a transparent adhesive material, for example. The transparent adhesive material is a resin light transmissive adhesive sheet, for example.

It should be noted that a pattern (hereinafter also referred to as "black pattern" or "black frame printing") is formed in the rim portion of the protective plate by printing using black ink. The black pattern is a light shielding film. The black pattern has an opening. The shape of the black pattern is a closed loop shape (frame shape). The black pattern is formed according to protective plates having various specifications.

The black pattern is formed to reduce reflection of external light on the front surface of the display device and prevent deterioration of visibility, for example. In addition, the black pattern is formed to improve design properties of a case, a housing, a display panel, and the like of the display device, for example.

It should be noted that in a plan view, a display region of the liquid crystal panel is present in the opening of the black pattern. Hereinafter, the outline of the opening of the black pattern (light shielding film) is also referred to as "opening outline". In addition, hereinafter, the region where the black pattern exists in a plan view of the liquid crystal display device is also referred to as a "black pattern region".

A liquid crystal display device including a protective plate provided with a black pattern has the following problems in addition to the reflection problem accompanying the presence of the air layer. The problem is that when the black pattern opening outline (boundary) is visually recognized, the design properties are deteriorated. The visual recognition of the black pattern opening outline is actualized when the black density is differently visually recognized due to the difference between the reflectance of the black pattern region and the reflectance of the liquid crystal panel, or the like, for example. It should be noted that the reflectance of a liquid crystal panel is the reflectance of the display region of the liquid crystal panel, or the reflectance of the peripheral portion of the display region of the liquid crystal panel, for example.

In order to solve these problems, one of the joint applicants of the present application has filed Japanese Patent Application Laid-Open No. 2018-081158. Japanese Patent Application Laid-Open No. 2018-081158 discloses a configuration (hereinafter also referred to as "related configuration A") that optimizes the film thickness of the back surface ITO according to a combination with each configuration.

The related configuration A discloses a configuration of making relatively thin the film thickness of the back surface ITO being a transparent conductive film, or a configuration of making relatively thick the film thickness of the back surface ITO. Specifically, the film thickness of the back surface ITO is set within the range of 25 nm to 40 nm, or within the range of 120 nm to 160 nm. Thus, the reflectance of the liquid crystal panel can be lowered to some extent.

As the reflectance of the liquid crystal panel is lowered to some extent, the reflection of the liquid crystal panel at the opening of the black pattern being a light shielding film is suppressed. Thus, the difference between the black density of the black pattern and the black density shown by the liquid crystal panel is reduced to some extent. Therefore, it can be suppressed to some extent that the opening outline of the black pattern being the light shielding film is visually recognized.

In addition, the other of the joint applicants of the present application has filed Japanese Patent Application Laid-Open No. 2013-114086 that copes with another problem in a liquid crystal display device provided with the back surface ITO. The other problem is a problem that a scratch occurs on the front surface of the counter substrate. Japanese Patent Application Laid-Open No. 2013-114086 discloses a configuration (hereinafter also referred to as "related configuration B") in which a scratch occurring on the front surface of the counter substrate is less likely to be visually recognized. In the related configuration B, two-layer films with optimized refractive indexes relationship are provided in the lower layer of the back surface ITO (transparent conductive film).

It should be noted that depending on the environment in which the liquid crystal display device including the liquid crystal panel of the lateral electric field drive system is used, it is required to make the outline of the opening of the light shielding film sufficiently less likely to be visually recognized. The related configurations A and B cannot meet this requirement.

SUMMARY

An object of the present invention is to provide a liquid crystal display device capable of making the outline of the opening of the light shielding film sufficiently less likely to be visually recognized.

A liquid crystal display device according to one aspect of the present invention includes: a liquid crystal panel of a lateral electric field drive system having a display surface being a surface on a viewing side; and a transparent protective member configured to cover the display surface of the liquid crystal panel. The liquid crystal panel includes: an array substrate, and a counter substrate being a substrate on a viewing side, the counter substrate configured to face the array substrate. A liquid crystal layer is sandwiched between the counter substrate and the array substrate. The counter substrate has an outer front surface being a surface on a viewing side. The liquid crystal panel further includes: a laminated film provided on the outer front surface of the counter substrate, and a transparent conductive film provided on the laminated film. The transparent conductive film exists on the display surface side of the liquid crystal panel. In the liquid crystal panel, a display region on which an image is displayed exists on the display surface side of the liquid crystal panel. A light shielding film having an opening is provided in a rim portion of a surface covering the display surface of the transparent protective member. The transparent protective member is stuck to the display surface of the liquid crystal panel via a transparent adhesive material. In a plan view, the transparent conductive film covers the display region. In a plan view, the transparent conductive film overlaps an outline of the opening of the light shielding film provided in the transparent protective member. The opening is configured so that external light can reach the display region through the opening. The laminated film as a lower layer of the transparent conductive film includes: a first low refractive index layer made of a first material having a refractive index of light in a range of 1.4 to 1.6; a first high refractive index layer made of a second material having a refractive index of light in a range of 1.9 to 2.1; a second low refractive index layer made of the first material; and a second high refractive index layer made of the second material. In a direction from the transparent conductive film toward the counter substrate, the first low refractive index layer, the first high refractive index layer, the second low refractive index layer, and the second high refractive index layer are provided to exist in order of the first low refractive index layer, the first high refractive index layer, the second low refractive index layer, and the second high refractive index layer.

According to the present invention, the liquid crystal display device includes a liquid crystal panel of a lateral electric field drive system having a display surface, and a transparent protective member configured to cover the display surface of the liquid crystal panel. The liquid crystal panel includes: a laminated film provided on the outer front surface of the counter substrate; and a transparent conductive film provided on the laminated film. That is, the laminated film is provided between the transparent conductive film and the counter substrate so that the laminated film is in contact with the transparent conductive film and the counter substrate.

A light shielding film having an opening is provided in a rim portion of a surface covering the display surface of the transparent protective member. The opening is configured so that external light can reach the display region through the opening.

In addition, the laminated film includes a first low refractive index layer, a first high refractive index layer, a second low refractive index layer, and a second high refractive index layer. In a direction from the transparent conductive film toward the counter substrate, the first low refractive index layer, the first high refractive index layer, the second low refractive index layer, and the second high refractive index layer are provided to exist in order of the first low refractive index layer, the first high refractive index layer, the second low refractive index layer, and the second high refractive index layer.

In addition, each of the first low refractive index layer and the second low refractive index layer is made of a first material. The refractive index of light of the first material is in the range of 1.4 to 1.6. Each of the first high refractive index layer and the second high refractive index layer is made of a second material. The refractive index of light of the second material is in the range of 1.9 to 2.1.

It should be noted that the inventors of the present application confirmed by experiment that the liquid crystal display device having the above-described configuration can make the outline of the opening of the light shielding film sufficiently difficult to be visually recognized. Thus, the above-described configuration included in the liquid crystal display device obtains a specific effect that the opening outline of the light shielding film can be made sufficiently difficult to be visually recognized.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a cross-sectional view mainly showing a configuration of a laminated film according to the first preferred embodiment;

FIG. 5 is a diagram showing a table in Examples;

FIG. 7 is a diagram showing a table in an Examination example;

FIG. 8 is a graph showing the wavelength dependence of the transmittance and reflectance of the liquid crystal panel in the liquid crystal display device of Example 1; and FIGS. 9A and 9B, 10A and 10B, 11A and 11B, 12A and 12B, and 13A and 13B are graphs each showing the wavelength dependence of transmittance and reflectance of a liquid crystal panel in liquid crystal display devices of Approximate examples.

DESCRIPTION OF THE PREFERRED EMBODIMENTS

Figure 1:
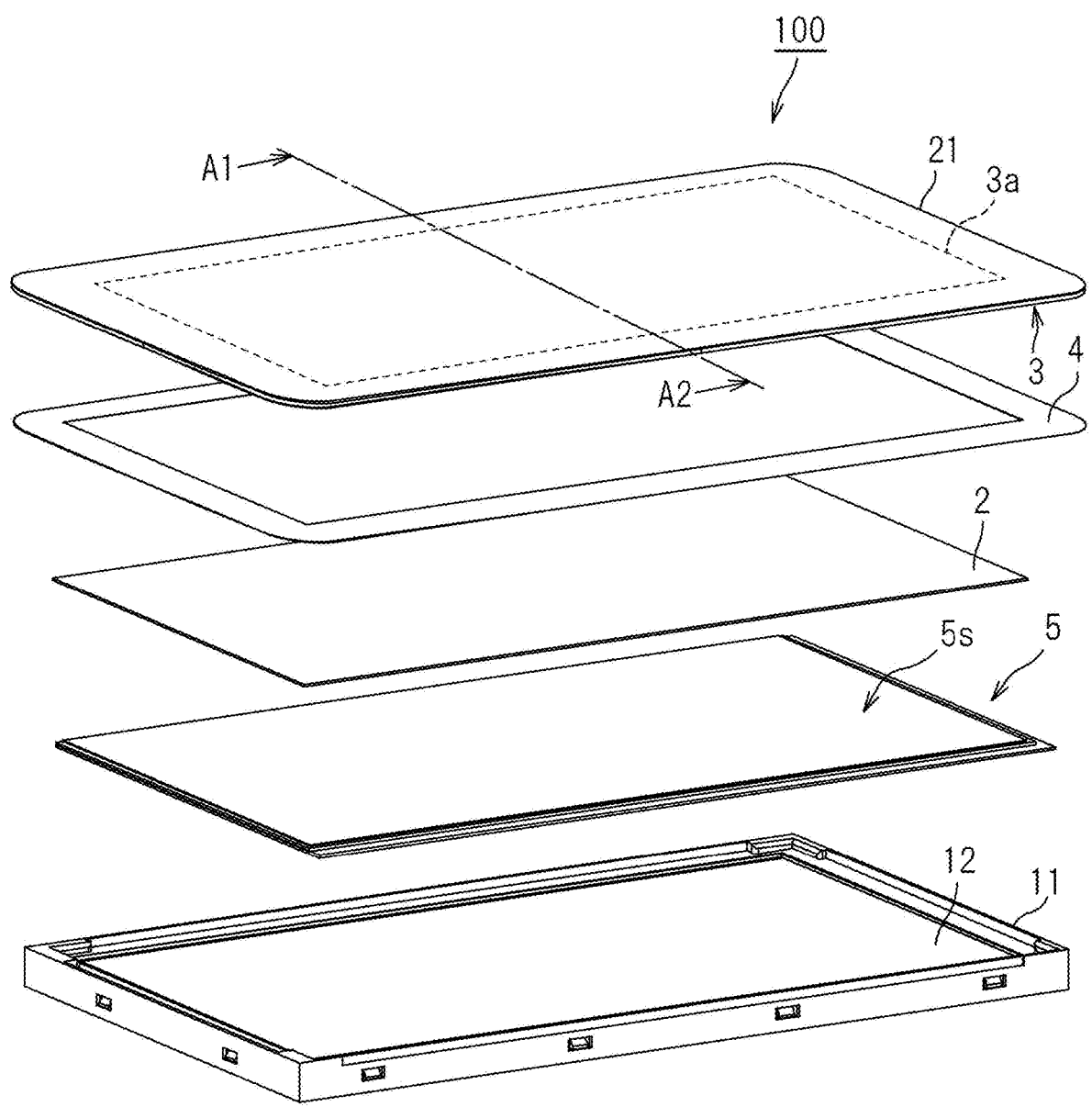
FIG. 1 is an exploded perspective view of a liquid crystal display device according to a first preferred embodiment.

Hereinafter, preferred embodiments will be described with reference to the drawings. In the following drawings, the same components are denoted by the same reference numerals. The names and functions of respective components denoted by the same reference numerals are the same. Therefore, a detailed description of a part of each component denoted by the same reference numeral may be omitted.

It should be noted that the dimensions, materials, and shapes of components exemplified in the preferred embodiment, relative arrangements of such components, and the like may be appropriately changed according to the configuration, various conditions, and the like of the device. In addition, the dimensions of each component in the drawings may differ from the actual dimensions.

First Preferred Embodiment (Configuration of Liquid Crystal Display Device)

FIG. 1 is an exploded perspective view of the liquid crystal display device 100 according to the first preferred embodiment. In FIG. 1, an example of the configuration of the liquid crystal display device 100 is schematically shown.

In FIG. 1, the X direction, the Y direction, and the Z direction are orthogonal to one another. The X, Y, and Z directions illustrated in the following drawings are also orthogonal to one another. Hereinafter, a direction including the X direction and a direction opposite to the X direction (−X direction) is also referred to as "X-axis direction". In addition, hereinafter, a direction including the Y direction and a direction opposite to the Y direction (−Y direction) is also referred to as "Y-axis direction". In addition, hereinafter, a direction including the Z direction and a direction opposite to the Z direction (−Z direction) is also referred to as "Z-axis direction".

In addition, hereinafter, a plane including the X-axis direction and the Y-axis direction is also referred to as "XY plane". In addition, hereinafter, a plane including the X-axis direction and the Z-axis direction is also referred to as "XZ plane". In addition, hereinafter, a plane including the Y-axis direction and the Z-axis direction is also referred to as "YZ plane".

Figure 2:
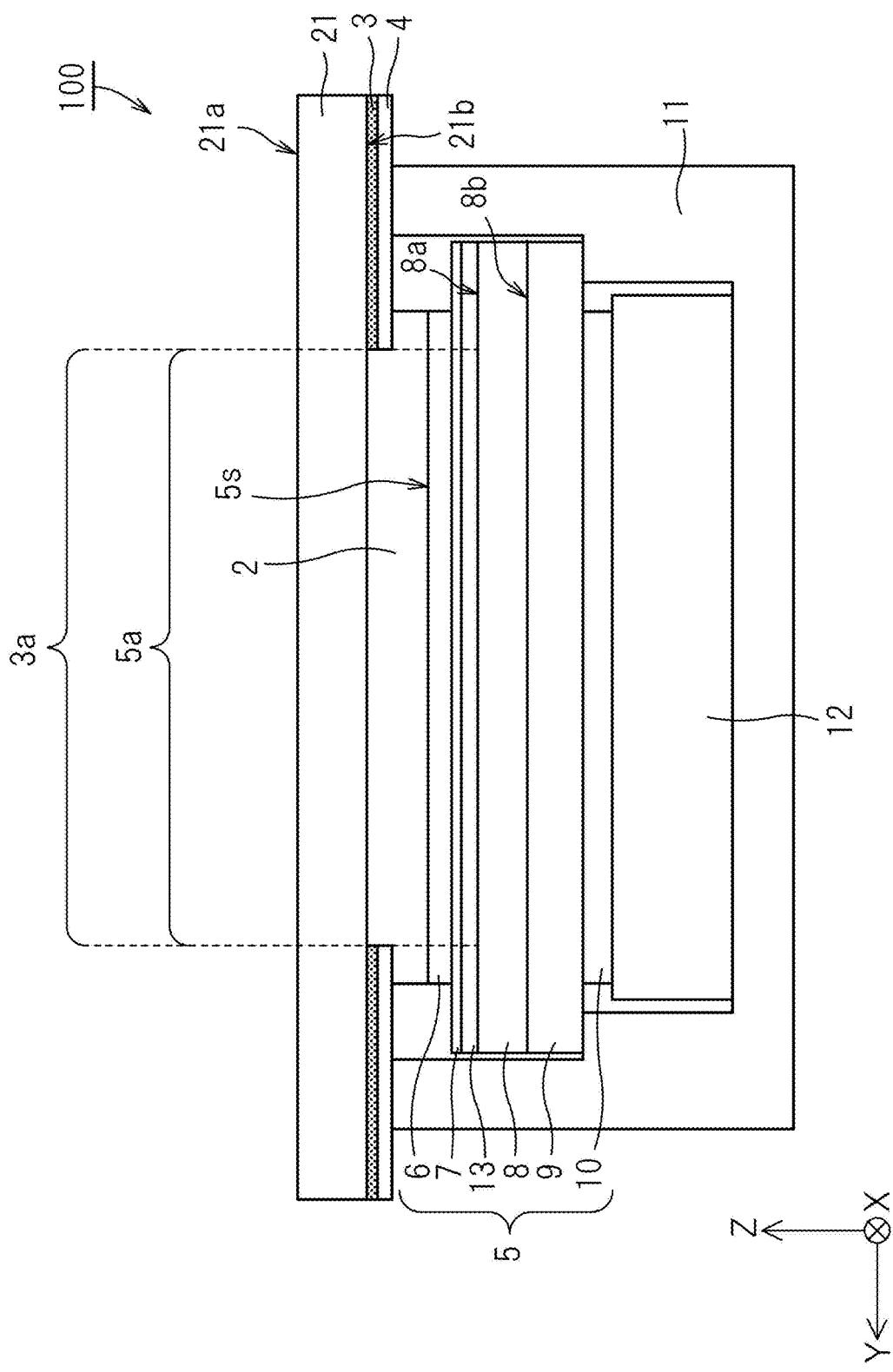
FIG. 2 is a cross-sectional view of the liquid crystal display device taken along line A1-A2 in FIG. 1.

FIG. 2 is a cross-sectional view of the liquid crystal display device 100 taken along line A1-A2 in FIG. 1. With reference to FIGS. 1 and 2, the liquid crystal display device 100 includes a transparent protective member 21, a transparent adhesive material 2, a light shielding film 3, an adhesive material 4, a liquid crystal panel 5, a housing 11, and a backlight unit 12.

The housing 11 accommodates the liquid crystal panel 5 and the backlight unit 12. The backlight unit 12 emits light toward the liquid crystal panel 5.

The liquid crystal panel 5 is a liquid crystal panel of the lateral electric field drive system. The liquid crystal panel 5 displays an image using light emitted from the backlight unit 12. The liquid crystal panel 5 includes an array substrate 9, a counter substrate 8, polarizing plates 6 and 10, a transparent conductive film 7, and a laminated film 13.

Each of the array substrate 9 and the counter substrate 8 has translucency. Each of the array substrate 9 and the counter substrate 8 is, for example, a glass substrate. The counter substrate 8 is a substrate on the viewing side. The counter substrate 8 faces the array substrate 9. The counter substrate 8 includes an outer front surface 8a and an inner front surface 8b. The outer front surface 8a is a surface on the viewing side. A liquid crystal layer (not shown) is sandwiched between the inner front surface 8b of the counter substrate 8 and the array substrate 9.

The polarizing plate 10 is stuck to the outer front surface of the array substrate 9. The outer front surface of the array substrate 9 is a surface opposite to the surface in contact with the liquid crystal layer, of the array substrate 9. The polarizing plate 6 is stuck to the outer front surface of the transparent conductive film 7. The outer front surface of the transparent conductive film 7 is a surface opposite to the surface on the counter substrate 8 side, of the transparent conductive film 7.

On the inner front surface of the array substrate 9, circuit portions of a plurality of pixels including TFTs are formed. The inner front surface of the array substrate 9 is a surface in contact with a liquid crystal layer (not shown) of the array substrate 9. On the other hand, on the inner front surface 8b of the counter substrate 8, a color filter, a light shielding film (black matrix: BM), and the like are formed.

In addition, the laminated film 13 is provided on the outer front surface 8a of the counter substrate 8. The configuration of the laminated film 13 will be described below.

The transparent conductive film 7 is provided on the laminated film 13. That is, the laminated film 13 is sandwiched between the transparent conductive film 7 and the outer front surface 8a of the counter substrate 8. The transparent conductive film 7 has translucency. In addition, the transparent conductive film 7 has a function of suppressing the intrusion of an external electric field.

In addition, the liquid crystal panel 5 has a display surface 5s. The display surface 5s is a surface on the viewing side. The display surface 5s is the upper surface of the polarizing plate 6. It should be noted that the transparent conductive film 7 exists on the display surface 5s side of the liquid crystal panel 5.

Hereinafter, in the liquid crystal panel 5, a region where an image is displayed is also referred to as a "display region 5a". It should be noted that the display region 5a is also referred to as a "display area". The display region 5a exists on the display surface 5s side of the liquid crystal panel 5. Specifically, the display region 5a exists on the outer front surface 8a of the counter substrate 8.

The transparent conductive film 7 covers the entire outer front surface 8a of the counter substrate 8 in a plan view (XY plane). That is, the transparent conductive film 7 covers the display region 5a existing on the outer front surface 8a of the counter substrate 8 in a plan view. It should be noted that in a plan view, as long as the transparent conductive film 7 covers at least the display region 5a of the counter substrate 8, the transparent conductive film 7 does not have to cover the entire outer front surface 8a.

In addition, the transparent conductive film 7 is connected to the ground potential by a conductive member. That is, the transparent conductive film 7 is grounded. The conductive member is, for example, a conductive paste, a conductive tape, or the like. Hereinafter, in a plan view, the region other than the display region 5a in the liquid crystal panel 5 is also referred to as a "frame region" or a "non-display region". The conductive member is provided in the frame region.

In a plan view, the transparent protective member 21 covers the display surface 5s of the liquid crystal panel 5. The shape of the transparent protective member 21 is a plate shape. The transparent protective member 21 has translucency. The transparent protective member 21 has an outer front surface 21a and an inner front surface 21b. The outer front surface 21a is a surface on the viewing side. The outer front surface 21a is a display surface (front surface) of the liquid crystal display device 100.

It should be noted that AR treatment (antireflection treatment) may be performed on the outer front surface 21a of the transparent protective member 21. The inner front surface 21b is a surface that covers the display surface 5s of the transparent protective member 21. A light shielding film 3 is provided in the rim portion of the inner front surface 21b of the transparent protective member 21.

The light shielding film 3 is a film for preventing the light emitted from the backlight unit 12 from being visually recognized from the outside of the display region 5a of the liquid crystal panel 5. In addition, the light shielding film 3 is also a film for preventing light leaking from the rim portion of the counter substrate 8 from being visually recognized from the display surface (outer front surface 21a) side of the liquid crystal display device 100.

Figure 3:
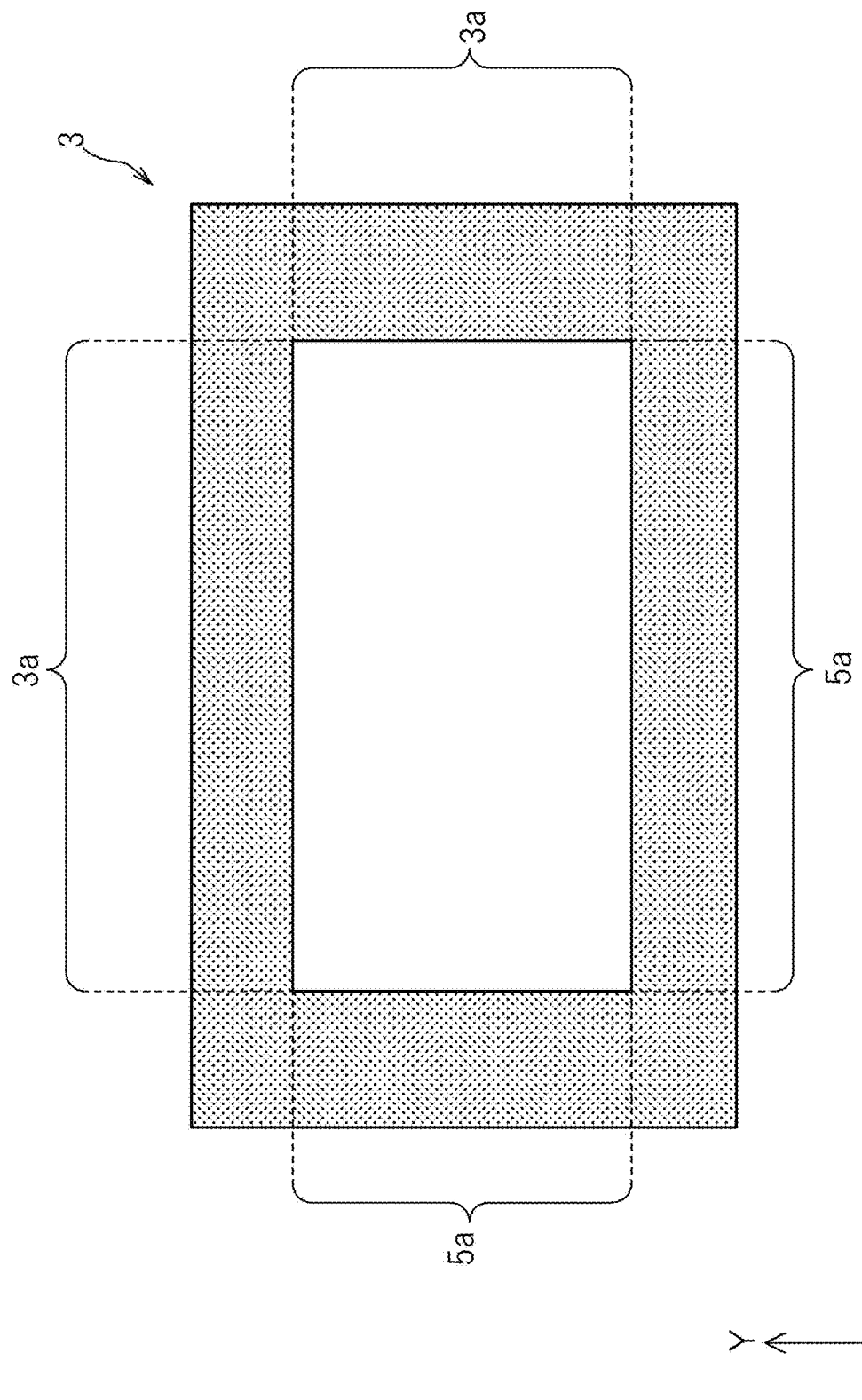
FIG. 3 is a plan view showing a simplified configuration of a light shielding film according to the first preferred embodiment.

FIG. 3 is a plan view showing a simplified configuration of the light shielding film 3 according to the first preferred embodiment. It should be noted that FIG. 3 also shows a display region 5a existing in an opening 3a described below in a plan view. The light shielding film 3 has a property of preventing light from passing therethrough. That is, the light shielding film 3 does not have translucency. The color of the light shielding film 3 is black. The light shielding film 3 is made of, for example, black ink. The light shielding film 3 has an opening 3a. The shape of the light shielding film 3 in a plan view is a closed loop shape (frame shape).

With reference to FIGS. 2 and 3, the size of the opening 3a in a plan view is slightly smaller than the size of the polarizing plate 6 in a plan view. It should be noted that the size of the opening 3a in a plan view may be the same as the size of the polarizing plate 6 in a plan view.

In addition, the opening 3a is configured so that external light can reach the display region 5a through the opening 3a. That is, the opening 3a is configured so that the display region 5a can be visually recognized from the outer front surface 21a side (viewing side) of the liquid crystal display device 100. The size of the opening 3a in a plan view is identical or equivalent to the size of the display region 5a in a plan view. In addition, the shape of the outline of the opening 3a in a plan view is a rectangle. Hereinafter, the outline of the opening 3a of the light shielding film 3 (black pattern) is also referred to as "opening outline".

The light shielding film 3 is formed by printing black ink on the inner front surface 21b of the transparent protective member 21, for example. Hereinafter, the light shielding film 3 is also referred to as "black pattern" or "black frame printing". In addition, hereinafter, the region where the black pattern (light shielding film 3) exists in a plan view of the liquid crystal display device 100 is also referred to as a "black pattern region".

The black pattern region is a region of the rim portion of the transparent protective member 21 in a plan view. It should be noted that in a plan view, the display region 5a exists in the opening 3a. Hereinafter, the display region 5a existing in the opening 3a in a plan view is also referred to as an "intra-opening display region".

In the counter substrate 8 of the liquid crystal panel 5, a black matrix as a light shielding film is provided in the peripheral portion of the display region 5a. The black matrix has an opening. The opening of the black matrix of the counter substrate 8 is configured to determine the outer shape of the display region 5a.

As described above, the size of the opening 3a is identical or equivalent to the size of the display region 5a. It should be noted that in the present preferred embodiment, the size of the opening 3a is slightly larger than the size of the opening of the black matrix of the counter substrate 8. Therefore, the size of the opening 3a is slightly larger than the size of the display region 5a.

The reason for this will be described below. The alignment accuracy between the liquid crystal panel 5 and the transparent protective member 21 provided with the light shielding film 3 is relatively low. Therefore, the size of the opening 3a is often set as described above so that the size of the display region 5a, the position of the opening outline, and the like do not change due to misalignment.

It should be noted that a configuration in which a dummy pixel region is provided in the peripheral portion of the display region 5a may be applied. The dummy pixel region is a region that always displays black. In the configuration, the position of the opening outline in a plan view is set in the dummy pixel region. Therefore, also in the configuration, the size of the opening 3a is slightly larger than the size of the display region 5a. The opening outline corresponds to the boundary between the light shielding film 3 and the peripheral portion of the display region 5a.

It should be noted that the size of the opening 3a may be the same as the size of the display region 5a. In this case, the opening outline corresponds to the boundary between the light shielding film 3 and the display region 5a.

The rim portion of the outer front surface 8a of the counter substrate 8 faces the light shielding film 3. As described above, the transparent conductive film 7 covers the entire outer front surface 8a of the counter substrate 8 in a plan view. Therefore, the transparent conductive film 7 also covers a region (rim portion) facing the light shielding film 3 of the outer front surface 8a of the counter substrate 8 in a plan view.

It should be noted that in a plan view, the outline of the opening 3a (opening outline) of the light shielding film 3 provided in the transparent protective member 21 overlaps the transparent conductive film 7. That is, the transparent conductive film 7 overlaps the outline of the opening 3a (opening outline) of the light shielding film 3 in a plan view.

In addition, the transparent protective member 21 is stuck to the display surface 5s (polarizing plate 6) of the liquid crystal panel 5 via the transparent adhesive material 2. The transparent adhesive material 2 is a transparent adhesive member, details of which will be described below.

In addition, the rim portion of the inner front surface 21b of the transparent protective member 21 (light shielding film 3) is also stuck to the housing 11 with a closed loop shaped (frame shaped) adhesive material 4. Thus, the transparent protective member 21 is also fixed to the housing 11.

It should be noted that the size of the transparent adhesive material 2 may be approximately the same as the size of the transparent protective member 21. In this case, the transparent protective member 21 can be fixed to the display surface 5s of the liquid crystal panel 5 and the housing 11 only by the transparent adhesive material 2. In this case, the adhesive material 4 may be omitted.

It should be noted that it is necessary to suppress the formation of an air layer between the transparent protective member 21 and the liquid crystal panel 5. Therefore, as a material constituting the transparent adhesive material 2, for example, a resin layer such as an injection resin or a light-transmitting adhesive sheet is selected.

The transparent adhesive material 2 is, for example, an adhesive sheet. The transparent adhesive material 2 may be a glass substrate, a transparent resin substrate made of polyethylene terephthalate (PET) resin, or the like, for example. The transparent adhesive material 2 has translucency.

The light refractive index of the transparent adhesive material 2 is the same as or equivalent to the light refractive index of the transparent protective member 21. It should be noted that the transparent adhesive material 2 and the transparent protective member 21 may be configured so that the difference in refractive index between the transparent adhesive material 2 and the transparent protective member 21 is within 30% of the larger refractive index. In addition, the light refractive index of the transparent adhesive material 2 is the same as or equivalent to the light refractive index of the polarizing plate 6.

It should be noted that an index matching layer may be provided between the transparent adhesive material 2 and the polarizing plate 6. The index matching layer is a laminated film including a low refractive index layer and a high refractive index layer. That is, the transparent adhesive material 2 may be stuck to the polarizing plate 6 via the index matching layer.

It should be noted that the liquid crystal display device 100 may have a configuration in which a touch panel is disposed between the transparent protective member 21 and the liquid crystal panel 5.

(Characteristic Configuration)

Next, a characteristic configuration of the present preferred embodiment (hereinafter also referred to as "characteristic configuration X") will be described. In the present preferred embodiment, the film thickness of the transparent conductive film 7 is a relatively thin film thickness. Specifically, the film thickness of the transparent conductive film 7 is in the range of 10 nm to 30 nm. The transparent conductive film 7 is a sputtered film (specifically, an ITO film) formed by the sputtering method. Here, as an example, the transparent conductive film 7 is formed under conditions of an average film thickness of 25 nm and a dispersion range of ±10%.

In addition, for example, when an ITO film in an amorphous state (also referred to as an amorphous ITO film) is selected as the transparent conductive film 7, the sheet resistance of the transparent conductive film 7 is in the range of 100Ω/□ to 300Ω/□. It should be noted that adjusting the film forming temperature (substrate temperature) when sputtering is performed adjusts the film quality, resistivity, and the like so that the sheet resistance of the obtained transparent conductive film 7 falls within the range of the above values.

In addition, when the effect of ESD resistance is emphasized and furthermore a transparent conductive film 7 with low sheet resistance is required, an ITO film with crystallinity (also referred to as a crystalline ITO film) may be selected as the transparent conductive film 7. The crystalline ITO film can be obtained by setting the film-forming temperature relatively high, for example. In addition, the crystalline ITO film can be obtained by performing additional annealing on the amorphous ITO film, for example.

When a crystalline ITO film is selected as the transparent conductive film 7, the sheet resistance of the transparent conductive film 7 is in the range of 50Ω/□ to 100Ω/□. However, when a crystalline ITO film is selected as the transparent conductive film 7, there occurs process restrictions such that it is needed to form the transparent conductive film 7 before forming the liquid crystal layer due to the temperature resistance of the liquid crystal material.

Furthermore, in the present preferred embodiment, a laminated film 13 is provided between the transparent conductive film 7 and the counter substrate 8 so that the laminated film 13 is in contact with the transparent conductive film 7 and the counter substrate 8. That is, the laminated film 13 is a lower layer of the transparent conductive film 7. The laminated film 13 is an antireflection layer for sufficiently suppressing reflection on the liquid crystal panel 5. The laminated film 13 has translucency.

FIG. 4 is a cross-sectional view mainly showing the configuration of the laminated film 13 as the lower layer of the transparent conductive film 7. In order to obtain the above-described specific effect, the laminated film 13 is configured by alternately providing a low refractive index layer and a high refractive index layer. That is, the laminated film 13 is multilayered. The laminated film 13 includes four layers as an example.

With reference to FIG. 4, the laminated film 13 includes a low refractive index layer 13a, a high refractive index layer 13b, a low refractive index layer 13c, and a high refractive index layer 13d. Each of the low refractive index layer 13a, the high refractive index layer 13b, the low refractive index layer 13c, and the high refractive index layer 13d has translucency.

In the direction from the transparent conductive film 7 toward the counter substrate 8, the low refractive index layer 13a, the high refractive index layer 13b, the low refractive index layer 13c, and the high refractive index layer 13d are provided to exist in order of the low refractive index layer 13a, the high refractive index layer 13b, the low refractive index layer 13c, and the high refractive index layer 13d.

That is, the transparent conductive film 7 is provided on the low refractive index layer 13a. The low refractive index layer 13a is provided on the high refractive index layer 13b. The high refractive index layer 13b is provided on the low refractive index layer 13c. The low refractive index layer 13c is provided on the high refractive index layer 13d.

Hereinafter, the material constituting the low refractive index layer is also referred to as "material Ma". The material Ma is a transparent material. In addition, hereinafter, the refractive index of light is also referred to as "light refractive index" or "refractive index". The light is generally in the visible light range.

The refractive index of the material Ma is in the range of 1.4 to 1.6. The refractive index of the material Ma in the present preferred embodiment is identical or equivalent to the refractive index of the glass substrate. The material Ma is, for example, silicon dioxide ($SiO_2$). Hereinafter, the film made of silicon dioxide is also referred to as "silicon dioxide film" or "$SiO_2$ film".

In addition, the silicon dioxide film is a film having little wavelength dependence of the refractive index. Therefore, the reflection can be reduced flat on average over a wide wavelength range.

Hereinafter, the material constituting the high refractive index layer is also referred to as "material Mb". The material Mb is a transparent material. The light refractive index of the material Mb is in the range of 1.9 to 2.1. The refractive index of the material Mb is identical or equivalent to the refractive index of the transparent conductive film 7. In addition, the material Mb has conductivity. Therefore, the material Mb is ITO, indium zinc oxide (IZO), or the like. The high refractive index layer made of the material Mb is a transparent conductive film such as an ITO film or an IZO film.

Each of the low refractive index layer 13a and the low refractive index layer 13c is made of the material Ma (silicon dioxide). That is, each of the low refractive index layer 13a and the low refractive index layer 13c is a silicon dioxide film ($SiO_2$ film). Therefore, the refractive index of each of the low refractive index layer 13a and the low refractive index layer 13c is in the range of 1.4 to 1.6.

Each of the high refractive index layer 13b and the high refractive index layer 13d is made of the material Mb (ITO or IZO). That is, each of the high refractive index layer 13b and the high refractive index layer 13d is a transparent conductive film such as an ITO film or an IZO film. Therefore, the refractive index of each of the high refractive index layer 13b and the high refractive index layer 13d is in the range of 1.9 to 2.1.

The range of the suitable film thickness of the low refractive index layer and the high refractive index layer for obtaining the above-described specific effect is as follows. The film thickness of the low refractive index layer 13a is in the range of 30 nm to 65 nm. Here, as an example, an $SiO_2$ film (silicon dioxide film) is formed as the low refractive index layer 13a under the conditions of an average film thickness of 40 nm and a dispersion range of ±10%.

In addition, the film thickness of the high refractive index layer 13b is in the range of 25 nm to 80 nm. Here, as an example, an ITO film is formed as the high refractive index layer 13b under the conditions of an average film thickness of 40 nm and a dispersion range of ±10%.

In addition, the film thickness of the low refractive index layer 13c is in the range of 15 nm to 60 nm. Here, as an example, an $SiO_2$ film is formed as the low refractive index layer 13c under the conditions of an average film thickness of 40 nm and a dispersion range of ±10%.

In addition, the film thickness of the high refractive index layer 13d is in the range of 10 nm to 30 nm. Here, as an example, an ITO film is formed as the high refractive index layer 13d under the conditions of an average film thickness of 20 nm and a dispersion range of ±10%.

It should be noted that the refractive index of the $SiO_2$ film with respect to light having a wavelength of 550 nm is 1.48.

The refractive index of the ITO film with respect to light having a wavelength of 550 nm is 1.92.

In addition, in order to obtain the above-described specific effect, the film thickness of the transparent conductive film 7 and the film thickness of each layer constituting the laminated film 13 are set to suitable film thicknesses in the film thickness range defined above. For example, in order to optimize the color balance of the display light, the average film thickness described above is applied to the film thickness of the transparent conductive film 7 and the film thickness of each layer constituting the laminated film 13.

Hereinafter, the main configuration of the above-described characteristic configuration X is also referred to as "characteristic configuration Xa". In the characteristic configuration Xa, the laminated film 13 is provided between the transparent conductive film 7 and the counter substrate 8 so that the laminated film 13 is in contact with the transparent conductive film 7 and the counter substrate 8.

In addition, in the characteristic configuration Xa, the laminated film 13 includes a low refractive index layer 13a, a high refractive index layer 13b, a low refractive index layer 13c, and a high refractive index layer 13d. In the direction from the transparent conductive film 7 toward the counter substrate 8, the low refractive index layer 13a, the high refractive index layer 13b, the low refractive index layer 13c, and the high refractive index layer 13d are provided to exist in order of the low refractive index layer 13a, the high refractive index layer 13b, the low refractive index layer 13c, and the high refractive index layer 13d.

In addition, in the characteristic configuration Xa, each of the low refractive index layer 13a and the low refractive index layer 13c is made of the material Ma (silicon dioxide). The refractive index of the material Ma is in the range of 1.4 to 1.6. Each of the high refractive index layer 13b and the high refractive index layer 13d is made of the material Mb (ITO or IZO). The light refractive index of the material Mb is in the range of 1.9 to 2.1.

It should be noted that a low refractive index layer and a high refractive index layer may be further added below the laminated film 13. In this case, it is desirable that the low refractive index layer and the high refractive index layer are applied with a material identical to and a film thickness equivalent to those of the low refractive index layer 13c and the high refractive index layer 13d, respectively.

However, when further multilayering is performed, the antireflection effect due to the interference action can be enhanced, but there also occurs a disadvantage. The disadvantage is, for example, an increase in formation cost. In addition, the disadvantage is a disadvantage that as the stress of the laminated film increases, the laminated film becomes likely to peel, for example.

Therefore, it is desirable that the laminated film 13 has the four-layer configuration exemplified above. In addition, it is desirable that corresponding to the material, refractive index, and film thickness in the transparent conductive film 7, the material, refractive index, and film thickness described above are appropriately also applied to the low refractive index layer 13a, the high refractive index layer 13b, the low refractive index layer 13c, and the high refractive index layer 13d. With these desirable configurations, the above-described specific effect can be sufficiently obtained. Therefore, from the above viewpoint, it is best balanced in consideration of each element that the laminated film 13 has the four-layer configuration exemplified above.

EXAMPLE (Action and Effect)

Next, actions and effects obtained in the structure of the liquid crystal display device 100 according to Example 1 will be described together with experimental results in Comparative example 1, Comparative example 2, and Comparative example 3. Although details will be described below, each of Comparative example 1, Comparative example 2, and Comparative example 3 is an example in which the configuration of the laminated film 13 of the first preferred embodiment is changed.

Hereinafter, the low refractive index layer 13a is also referred to as a "lower layer film a". In addition, hereinafter, the high refractive index layer 13b is also referred to as a "lower layer film b". In addition, hereinafter, the low refractive index layer 13c is also referred to as a "lower layer film c". In addition, hereinafter, the high refractive index layer 13d is also referred to as a "lower layer film d".

The configuration of the laminated film 13 is the configuration shown in Table Tb1 in FIG. 5. Table Tb1 shows the type of the lower layer film and the film thickness of the lower layer film. The liquid crystal display device 100 according to Example 1 is a device in which the configuration of the laminated film 13 of the liquid crystal display device 100 of the first preferred embodiment is the configuration shown in Table Tb1 in FIG. 5. The liquid crystal display devices according to Comparative example 1 to Comparative example 3 are devices in which the configuration of the laminated film 13 of the liquid crystal display device 100 of the first preferred embodiment is changed to the configurations shown in Table Tb1 in FIG. 5.

With reference to Table Tb1 in FIG. 5, in Example 1, the transparent conductive film 7 is an ITO film. It should be noted that the transparent conductive film 7 in each of Comparative example 1, Comparative example 2, and Comparative example 3 is also an ITO film. In addition, in Example 1, the lower layer film a, the lower layer film b, the lower layer film c, and the lower layer film d are respectively an $SiO_2$ film, an ITO film, an $SiO_2$ film, and an ITO film.

In addition, in Example 1, the film thickness of the transparent conductive film 7 is 25 nm. The film thickness of the transparent conductive film 7 in each of Comparative example 1, Comparative example 2, and Comparative example 3 is also 25 nm. In addition, in Example 1, the film thickness of each of the lower layer films a, b, and c is 40 nm. In addition, in Example 1, the film thickness of the lower layer film d is 20 nm.

The configuration of Comparative example 1 is a configuration in which the laminated film 13 is not provided below the transparent conductive film 7. That is, the configuration of Comparative example 1 is a configuration in which the transparent conductive film 7 is provided on the counter substrate 8 (glass substrate). The configuration of Comparative example 1 corresponds to the related configuration A described above.

In addition, the configuration of Comparative example 2 is different from the configuration of Example 1 in that the lower layer film c and the lower layer film d in the laminated film 13 are not provided. That is, the configuration of Comparative example 2 is a configuration in which a two-layer film including the lower layer films a and b is provided below the transparent conductive film 7. In addition, the configuration of Comparative example 3 is different from the configuration of Comparative example 2 in that the lower layer film b is an $Nb_2O_5$ film.

The inventors of the present application created prototypes of the liquid crystal display device 100 having the configuration of Example 1 and liquid crystal display devices having the configurations of Comparative example 1 to Comparative example 3, and evaluated the visibility of the opening outline as an experiment. Hereinafter, the evaluation of visibility of the opening outline is also referred to as "visibility evaluation". Specifically, a three-level visibility evaluation using "∘" (excellent), "Δ" (fair), and "x" (poor) was performed.

Hereinafter, the state in which the liquid crystal display device is not driven is also referred to as a "non-driven state". In addition, hereinafter, the state in which the liquid crystal display device displays black in the display region 5a is also referred to as a "black display state". In addition, hereinafter, the situation where a white fluorescent lamp is lit near above the liquid crystal display device is also referred to as "lighting situation".

The visibility of the opening outline is particularly problematic when the liquid crystal display device is in a non-driven state or a black display state. Thus, the inventors of the present application performed visibility evaluation as an experiment in the following observation situation A in each configuration of Example 1 and Comparative examples 1, 2, and 3.

The observation situation A is a situation in which the inventors observe the front surface of the liquid crystal display device 100 from near the front of the display region 5a of the liquid crystal display device 100 in the non-driven state in the lighting situation. Hereinafter, the experiment in which the visibility evaluation is performed in the observation situation A is also referred to as "experiment J1".

In the observation situation A, when the opening outline can be clearly recognized, the evaluation of visibility was expressed by "x". In addition, in the observation situation A, when the opening outline looks a little pale but the presence of the opening outline is a concern, the visibility evaluation was expressed by "Δ". In the observation situation A, when the opening outline cannot be recognized, the visibility evaluation was expressed by "∘". In addition, in the observation situation A, also when the opening outline can be recognized with little concern, the visibility evaluation was expressed by "∘".

The results of the above evaluation will be described by using Table Tb1 in FIG. 5 and FIGS. 6A to 6D. In the field of "Visibility" in Table Tb1, evaluation results of "∘", "x", and "Δ" are shown. FIGS. 6A to 6D are diagrams conceptually showing the state of visibility of the liquid crystal display device according to Example 1, Comparative example 1, Comparative example 2, and Comparative example 3 in the observation situation A, respectively.

Figure 6A:
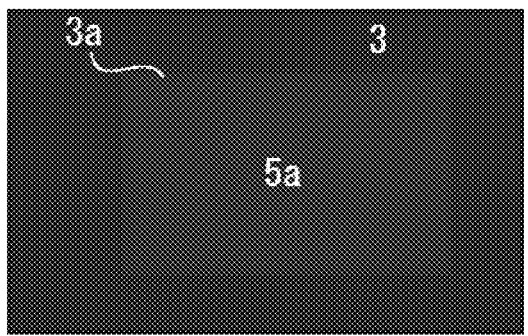
FIGS. 6A to 6D are diagrams conceptually showing states of visibility of liquid crystal display devices.
Figure 6B:
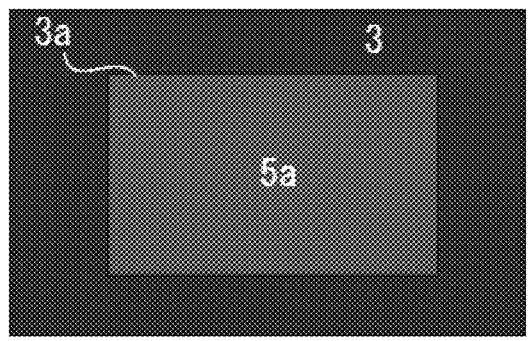
Figure 6C:
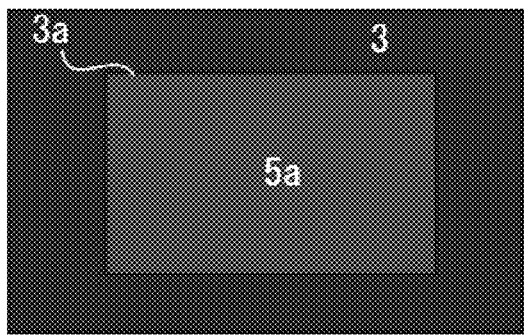
Figure 6D:
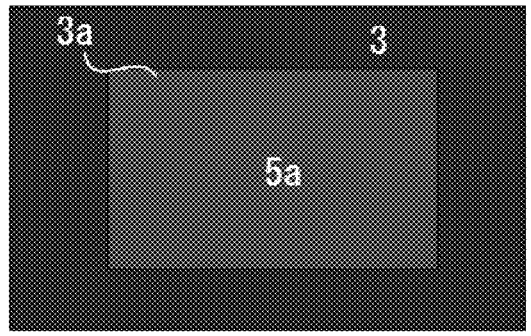
Figure 9A:
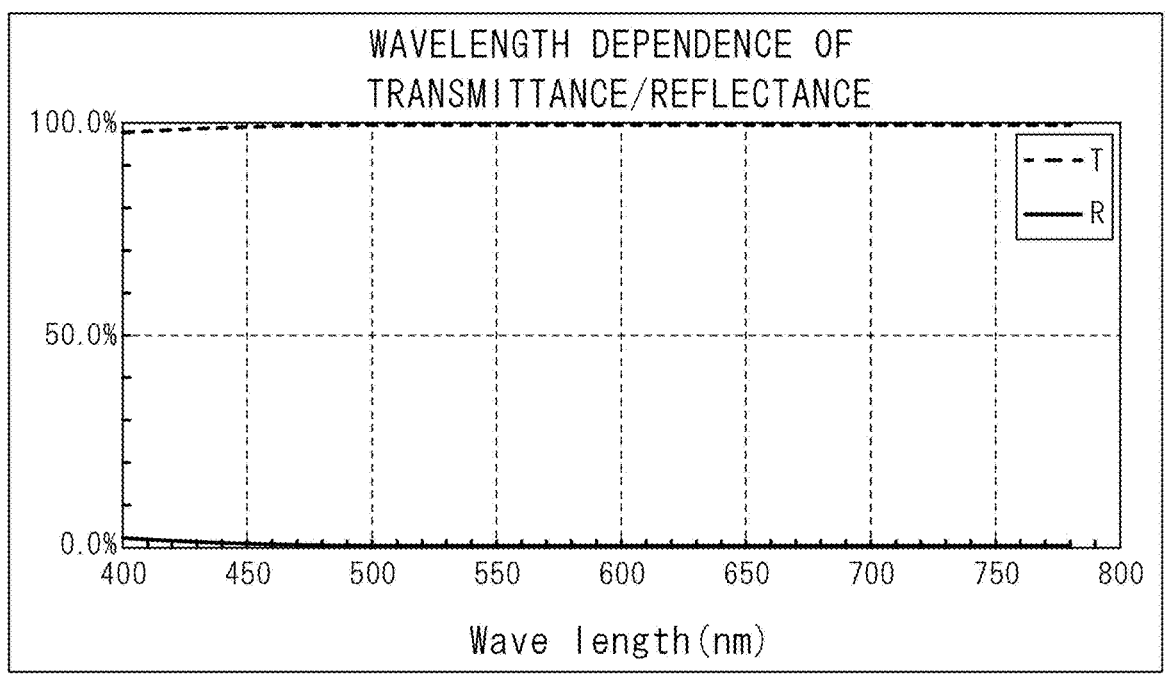
Figure 9B:
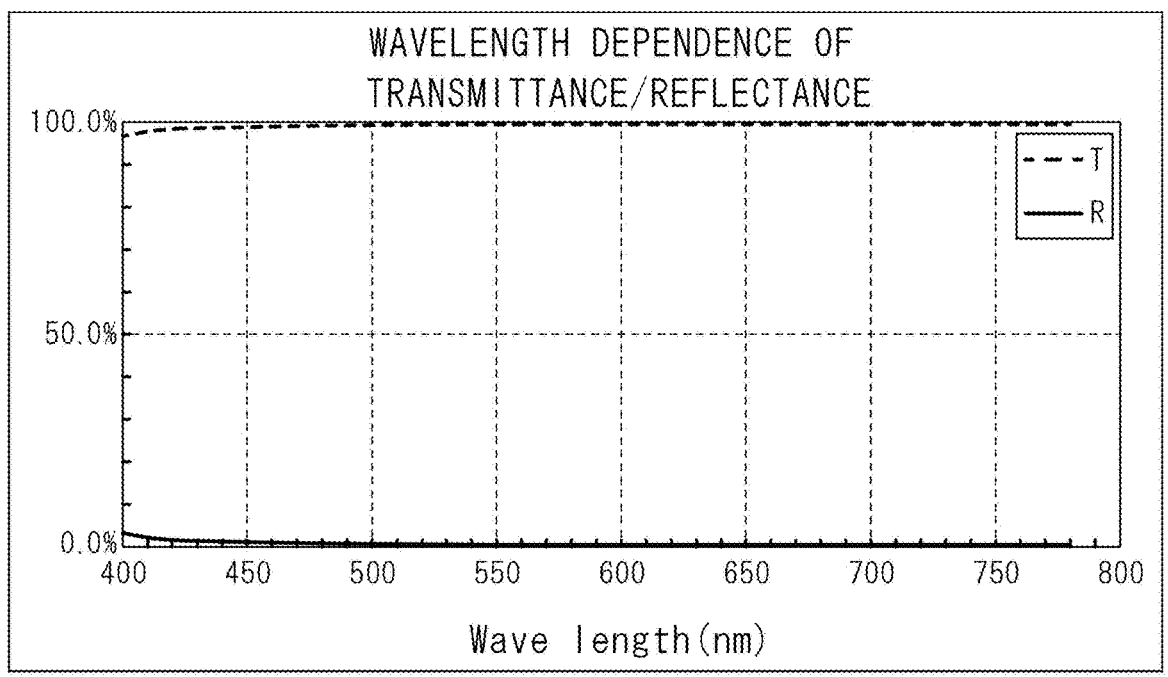
Figure 10A:
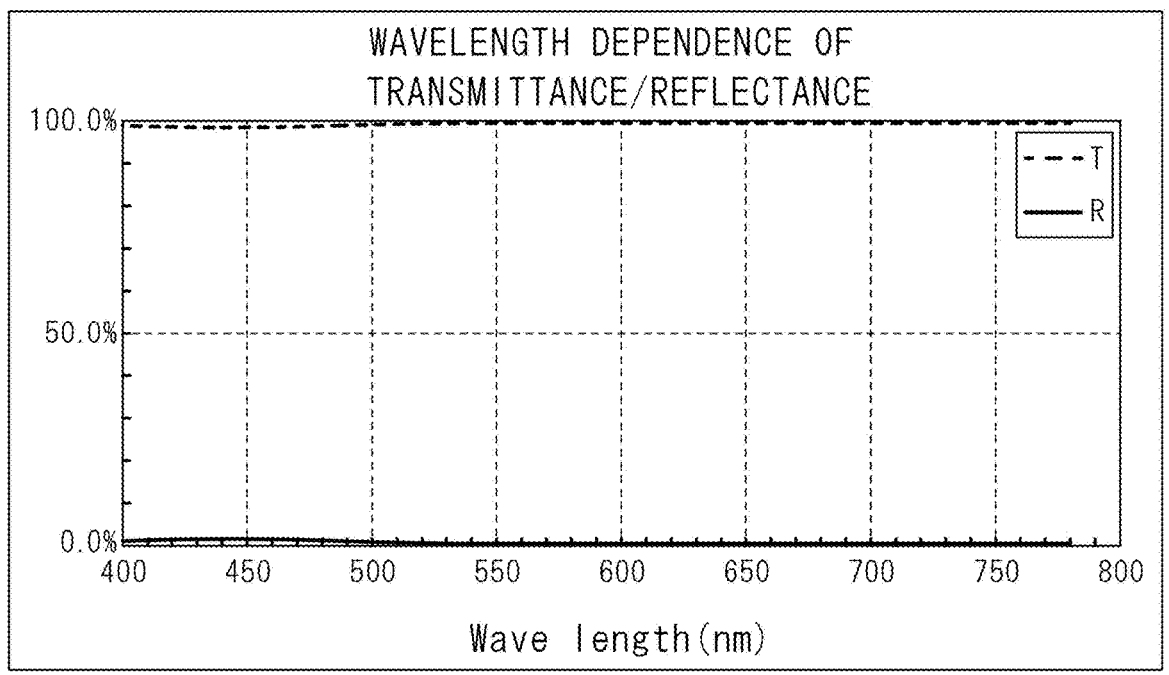
Figure 10B:
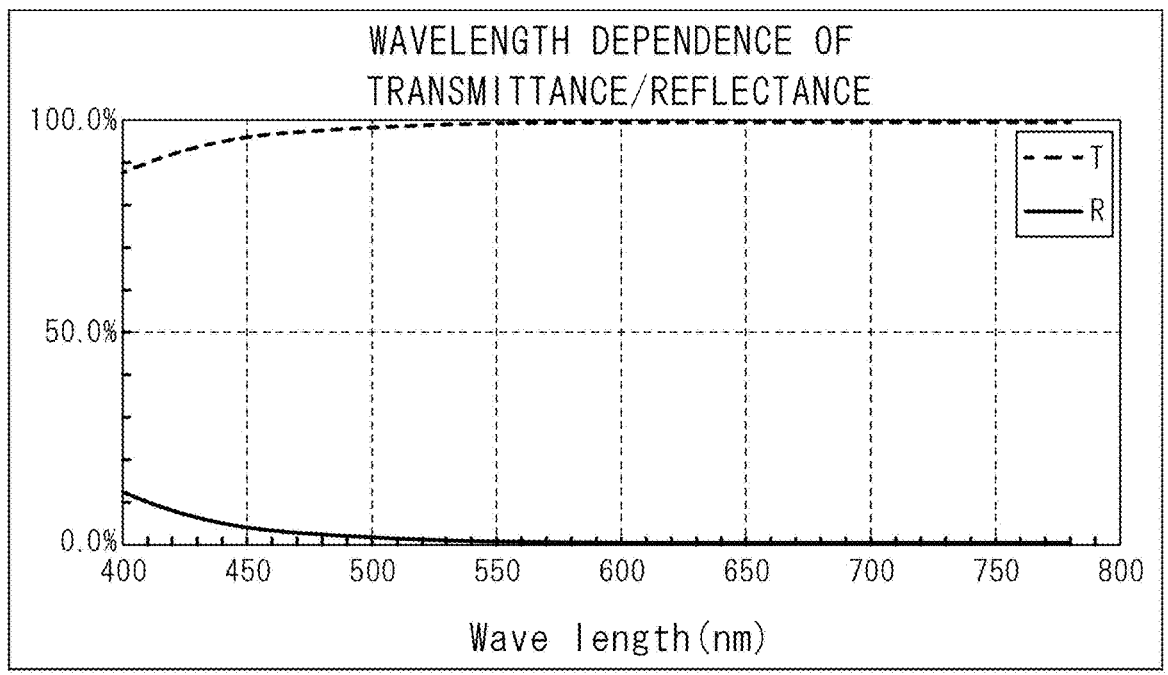

FIG. 6A shows the state of visibility of the liquid crystal display device having the configuration of Example 1 in the observation situation A. FIG. 6B shows the state of visibility of the liquid crystal display device having the configuration of Comparative example 1 in the observation situation A. FIG. 6C shows the state of visibility of the liquid crystal display device having the configuration of Comparative example 2 in the observation situation A. FIG. 6D shows the state of visibility of the liquid crystal display device having the configuration of Comparative example 3 in the observation situation A.

In the configuration of Example 1, as shown in FIG. 6A, it was in a state where the opening outline cannot be recognized in the observation situation A, or in a state where the opening outline can be recognized in the observation situation A with little concern. Therefore, the configuration of Example 1 was evaluated as "○" as shown in the visibility evaluation result of Table Tb1 in FIG. 5.

In the configurations of Comparative example 1 to Comparative example 3, as shown in FIGS. 6B, 6C, and 6D, in the observation situation A, it was in a state where the opening outline looks a little pale, but the presence of the opening outline is a concern. Therefore, the configurations of Comparative example 1 to Comparative example 3 were evaluated as "Δ" as shown in the visibility evaluation results of Table Tb1.

In addition, in the configuration of Comparative example 2 and the configuration of Comparative example 3, the difference between the black density of the black pattern region and the black density of the intra-opening display region is smaller than that in the configuration of Comparative example 1. However, in the configuration of Comparative example 3 in particular, it is confirmed that the black pattern region shows black, while the intra-opening display region is colored. Therefore, the tint inside the opening outline is different from the tint outside the opening outline, and the opening outline can be identified. Thus, when an image is displayed on the display region 5a, the displayed image is colored. As a result, the display quality of the image itself was deteriorated.

In addition, in the configuration of Comparative example 2, a relatively high level of visibility is obtained from the viewpoint of the visibility of the opening outline and the coloring of the intra-opening display region. However, the configuration of Comparative example 2 was in a state of more concerning about the presence of the opening outline than the configuration of Example 1. Therefore, it was confirmed that there is a large difference between the configuration of Comparative example 2 and the configuration of Example 1.

From the above evaluation results, the configuration of Example 1 in Table Tb1 was in a state where the opening outline cannot be recognized in the observation situation A, or in a state where the opening outline can be recognized in the observation situation A with little concern. In the configuration of Example 1, furthermore, no coloring in the intra-opening display region occurs, either.

Therefore, it was confirmed that a dramatic improvement effect is obtained with respect to the visibility of the opening outline. That is, in the configuration of Example 1, the above-described specific effect can be sufficiently obtained. It should be noted that in the configuration of Example 1, a transparent conductive film 7 having a function of suppressing the intrusion of an external electric field is used.

As described above, in the liquid crystal display device 100 of the first preferred embodiment having the above-described characteristic configuration Xa corresponding to the configuration of Example 1 in Table Tb1, both of suppression of reflection of external light incident on the display surface 5s side and suppression of intrusion of an external electric field from the counter substrate 8 side can be achieved. In addition, in the configuration of Example 1, a specific effect can be further obtained that suppressing reflection of external light incident on the display surface 5s side allows the opening outline to be made sufficiently difficult to be visually recognized.

That is, the inventors confirmed by experiment that the liquid crystal display device 100 of the first preferred embodiment having the characteristic configuration Xa corresponding to the configuration of Example 1 can make the opening outline of the light shielding film 3 sufficiently difficult to be visually recognized. Largely suppressing reflection of external light incident on the display surface 5s side of the liquid crystal panel 5 by the liquid crystal display device 100 having the characteristic configuration Xa achieves making the opening outline of the light shielding film 3 sufficiently difficult to be visually recognized. That is, the inventors confirmed by experiment that the liquid crystal display device 100 having the characteristic configuration Xa can make the opening outline almost inconspicuous.

In addition, the inventors confirmed by experiment that the liquid crystal display device 100 of the first preferred embodiment having the characteristic configuration Xa corresponding to the configuration of Example 1 can make the opening outline less conspicuous than that of the related configuration A corresponding to the configuration of Comparative example 1.

It should be noted that visibility evaluation may be performed in the following observation situation Aa instead of the observation situation A. The observation situation Aa is a situation in which the inventors observe the front surface of the liquid crystal display device 100 from near the front of the display region 5a of the liquid crystal display device 100 in the black display state in the lighting situation. Hereinafter, the experiment in which the visibility evaluation is performed in the observation situation Aa is also referred to as "experiment J1a".

Also in experiment J1a, the same results as in experiment J1 described above are obtained. That is, in experiment J1a, the inventors can confirm that the liquid crystal display device 100 of the first preferred embodiment having the characteristic configuration Xa can make the opening outline of the light shielding film 3 almost inconspicuous.

In addition, in the configuration of Example 1, the film thickness of the transparent conductive film 7 and the film thickness of each layer constituting the laminated film 13 are suitably set. Thus, it is possible to reduce coloring in the case where the display light emitted from the display region 5a or the image displayed on the display region 5a is observed.

In addition, each of the high refractive index layer 13b and the high refractive index layer 13d in the laminated film 13 is an ITO film, as with the transparent conductive film 7. In addition, each of the low refractive index layer 13a and the low refractive index layer 13c is a $SiO_2$ film, as with the glass substrate.

Therefore, each layer constituting the transparent conductive film 7 and the laminated film 13 can be formed by alternately forming films of two kinds of materials. Furthermore, the total number of films to be formed is five, and the total number of the films is set to a necessary and sufficient number.

As described above, the liquid crystal display device 100 of the first preferred embodiment can be manufactured at a relatively low cost. That is, it is possible to obtain a remarkable effect that the opening outline can be made sufficiently difficult to be visually recognized at a relatively low cost.

In addition, the transparent conductive film 7 having a function of suppressing the intrusion of an external electric field is connected to the ground potential. In addition, the film quality and film thickness of the transparent conductive film 7 are adjusted so that the sheet resistance of the transparent conductive film 7 is in the range of 100Ω/□ to 300Ω/□. Thus, the effect of ESD resistance is sufficiently exhibited. Therefore, it is possible to obtain both the effect of making the opening outline sufficiently difficult to be visually recognized and the effect of ESD resistance at a high level.

In addition, when a crystalline ITO film is selected as the transparent conductive film 7, the film quality and film thickness of the transparent conductive film 7 are adjusted so that the sheet resistance of the transparent conductive film 7 is in the range of 50Ω/□ to 100Ω/□. Thus, the effect of ESD resistance can be further improved.

Examination Example 1

Next, verification for confirming an appropriate range of the film thickness of each film with respect to the wavelength dependence of the transmission characteristics and reflection characteristics of the liquid crystal panel 5 was performed. The transmission characteristics and reflection characteristics of the liquid crystal panel 5 are mainly transmission characteristics and reflection characteristics in the transparent conductive film 7 and the laminated film 13. It should be noted that the transmission characteristics and reflection characteristics of the liquid crystal panel 5 correlate with the visibility of the opening outline of the light shielding film 3 (black pattern), the coloring of the display image on the liquid crystal panel 5, and the like.

In the present Examination example, a plurality of examples obtained by changing a part of the configuration of Example 1 were set from Approximate example a1 and Approximate example a2 to Approximate example e1 and Approximate example e2.

In the present Examination example, in Example 1, transmittance and reflectance were calculated in the case where a part of the film thickness of the transparent conductive film 7 and the film thickness of the plurality of lower layer films in the laminated film 13 are changed. It should be noted that the change in the film thickness of each layer is performed with the film thickness of each layer shown in Example 1 as a central value.

Specifically, in the case where the configuration of the transparent conductive film 7 and the laminated film 13 in Example 1 is changed to the configuration shown in Table Tb2 in FIG. 7, the transmittance and reflectance of the liquid crystal panel 5 included in the liquid crystal display device 100 were calculated by simulation.

The transmittance of the liquid crystal panel 5 in the present Examination example is the transmittance of the external light with respect to the liquid crystal panel 5 in a situation where the external light is applied onto the display surface 5s of the liquid crystal panel 5. In addition, the reflectance of the liquid crystal panel 5 in the present Examination example is the reflectance of the external light with respect to the liquid crystal panel 5 in a situation where the external light is applied onto the display surface 5s of the liquid crystal panel 5.

Referring to Table Tb2 in FIG. 7, each of Approximate example a1 and Approximate example a2 to Approximate example e1 and Approximate example e2 in Table Tb2 is an example slightly deviating from the film thickness range of each layer defined in the first preferred embodiment.

Approximate example a1 and Approximate example a2 are different from Example 1 in the film thickness of the transparent conductive film 7. Specifically, Approximate example a1 is an example in which the film thickness of the transparent conductive film 7 is set to a film thickness slightly smaller than the lower limit value of the range defined in the first preferred embodiment. In addition, Approximate example a2 is an example in which the film thickness of the transparent conductive film 7 is set to a film thickness slightly larger than the upper limit value of the range defined in the first preferred embodiment.

In addition, each of Approximate example b1 and Approximate example b2 is different from Example 1 in the film thickness of the lower layer film a. Specifically, Approximate example b1 is an example in which the film thickness of the lower layer film a is set to a film thickness slightly smaller than the lower limit value of the range defined in the first preferred embodiment. In addition, Approximate example b2 is an example in which the film thickness of the lower layer film a is set to a film thickness slightly larger than the upper limit value of the range defined in the first preferred embodiment.

In addition, each of Approximate example c1 and Approximate example c2 is different from Example 1 in the film thickness of the lower layer film b. Specifically, Approximate example c1 is an example in which the film thickness of the lower layer film b is set to a film thickness slightly smaller than the lower limit value of the range defined in the first preferred embodiment. In addition, Approximate example c2 is an example in which the film thickness of the lower layer film b is set to a film thickness slightly larger than the upper limit value of the range defined in the first preferred embodiment.

In addition, each of Approximate example d1 and Approximate example d2 is different from Example 1 in the film thickness of the lower layer film c. Specifically, Approximate example d1 is an example in which the film thickness of the lower layer film c is set to a film thickness slightly smaller than the lower limit value of the range defined in the first preferred embodiment. In addition, Approximate example d2 is an example in which the film thickness of the lower layer film c is set to a film thickness slightly larger than the upper limit value of the range defined in the first preferred embodiment.

In addition, each of Approximate example e1 and Approximate example e2 is different from Example 1 in the film thickness of the lower layer film d. Specifically, Approximate example e 1 is an example in which the film thickness of the lower layer film d is set to a film thickness slightly smaller than the lower limit value of the range defined in the first preferred embodiment. In addition, Approximate example e2 is an example in which the film thickness of the lower layer film d is set to a film thickness slightly larger than the upper limit value of the range defined in the first preferred embodiment.

Each of FIGS. 8 to 13B is a graph showing the wavelength dependence of the transmittance and reflectance of the liquid crystal panel 5 in the liquid crystal display device. FIG. 8 is a graph corresponding to Example 1. FIG. 9A is a graph corresponding to Approximate example a1. FIG. 9B is a graph corresponding to Approximate example a2. FIG. 10A is a graph corresponding to Approximate example b1. FIG. 10B is a graph corresponding to Approximate example b2.

Figure 11A:
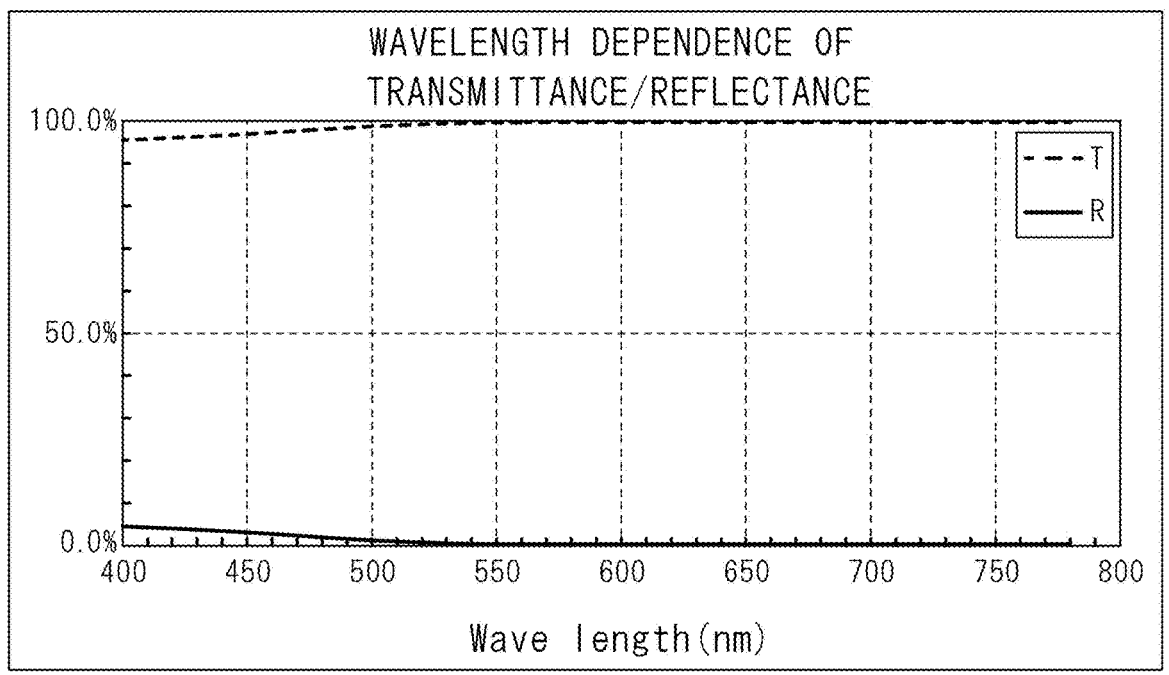
Figure 11B:
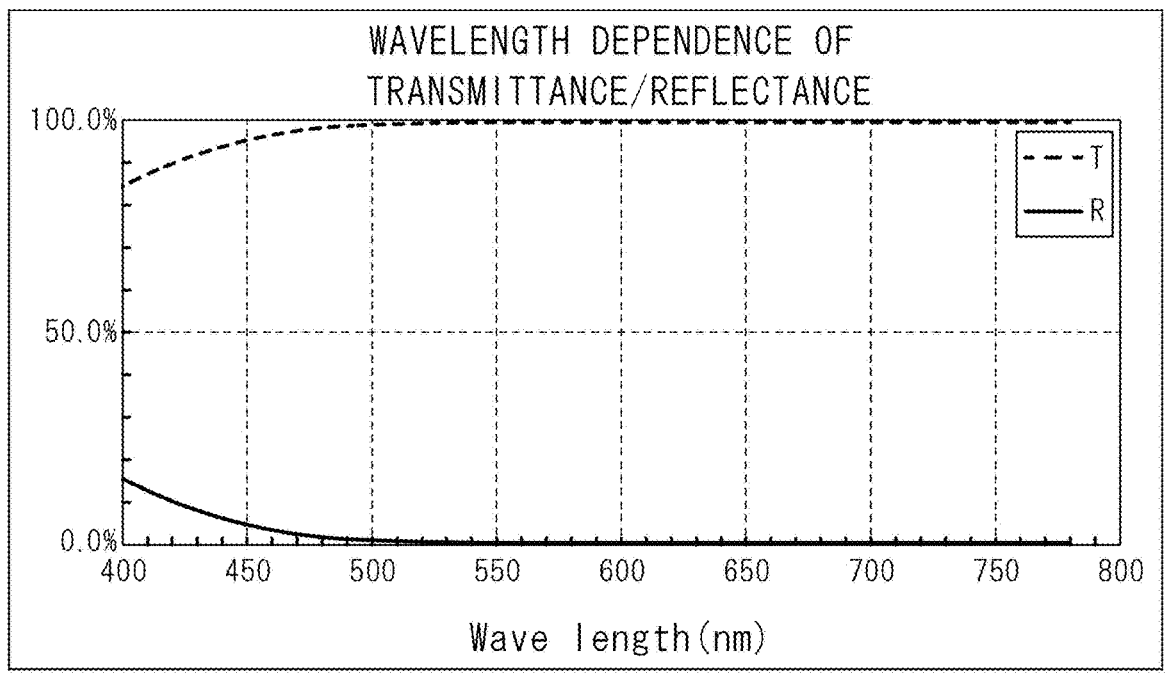

FIG. 11A is a graph corresponding to Approximate example c1. FIG. 11B is a graph corresponding to Approximate example c2. FIG. 12A is a graph corresponding to Approximate example d1. FIG. 12B is a graph corresponding to Approximate example d2. FIG. 13A is a graph corresponding to Approximate example e1. FIG. 13B is a graph corresponding to Approximate example e2.

Hereinafter, the wavelength dependence of the transmittance is also referred to as "wavelength dependence T". In addition, the wavelength dependence of the reflectance is also referred to as "wavelength dependence R".

In the graph in each of FIGS. 8 to 13B, the wavelength dependence T of the transmittance is indicated by a broken line. In addition, in each graph, the wavelength dependence R of the reflectance is indicated by a solid line. In each of FIGS. 8 to 13B, in general, data in the visible light region is shown. The visible light region is a range of light wavelength from 400 nm to 780 nm.

In Example 1, as shown in FIG. 8, the transmittance is almost 100% regardless of the wavelength band. In addition, in Example 1, the reflectance is almost 0% regardless of the wavelength band. Thus, it can be seen that there is almost no loss during transmission and unnecessary reflection. In addition, in Example 1, the absolute values of both loss during transmission and unnecessary reflection are low regardless of the wavelength band. Therefore, there is almost no influence by wavelength dependence, either. Accordingly, the transmitted light and the reflected light are hardly colored. That is, in Example 1, the maximum effect was obtained.

On the other hand, in each of Approximate examples in FIGS. 9 to 13B, in each wavelength band, the transmittance is approximately 95% or more and the reflectance is 5% or less. Loss during transmission and unnecessary reflection are suppressed. However, each characteristic is deteriorated mainly in a blue band having a wavelength of 450 nm or less. In particular, as severe deterioration, a state where the transmittance is below 95% and a state where the reflectance is above 5% occur.

In particular, in a specific wavelength band, when loss during transmission and unnecessary reflection are large, the transmitted light or reflected light is led to be colored. As a result, the display light is colored.

It should be noted that each Approximate example exemplified this time may have caused extreme deterioration because only the film thickness of one layer was changed. Thus, in order to alleviate the change in each characteristic caused by the change in the film thickness of one layer, the thickness of other layers may be appropriately changed in the suitable range defined in the first preferred embodiment. Thus, the change in each characteristic can be alleviated.

It should be noted that the above simulation result is not a result specialized in the case where the ITO film and the $SiO_2$ film are used in the transparent conductive film 7 and the lower layer film constituting the laminated film 13. Specifically, the simulation result is a result calculated based on the refractive index of the ITO film and the refractive index of the $SiO_2$ film.

Therefore, if a material having a refractive index equivalent to those of the ITO film and the $SiO_2$ film is used, approximately the same tendency can be obtained. That is, as long as the material has a refractive index equivalent to those of the ITO film and the $SiO_2$ film, the range of the film thickness of each layer, which is desirable from the viewpoint of coloring, is approximately common.

From the above results, it was confirmed that the configuration of the film thickness defined in the first preferred embodiment is useful. In the configuration of the film thickness, the film thickness of the transparent conductive film 7 is in the range of 10 nm to 30 nm. The film thickness of the low refractive index layer 13a is in the range of 30 nm to 65 nm. The film thickness of the high refractive index layer 13b is in the range of 25 nm to 80 nm. The film thickness of the low refractive index layer 13c is in the range of 15 nm to 60 nm. The film thickness of the high refractive index layer 13d is in the range of 10 nm to 30 nm.

The configuration of the film thickness obtains a specific effect that the opening outline can be made sufficiently difficult to be visually recognized. In addition, an effect can be obtained that it is possible to reduce coloring in the case where the display light emitted from the display region 5a or the image displayed on the display region 5a is observed. In addition, these effects can be obtained at a relatively high level.

It should be noted that the related configuration A described above cannot achieve that the opening outline can be made sufficiently difficult to be visually recognized. Generally, in a liquid crystal display device used for a display unit disposed in an onboard instrument panel unit, design properties tend to be emphasized. The display unit is referred to as a center information display (CID). In the liquid crystal display device, it is required that the opening outline is hardly visually recognized.

In addition, the related configuration B is a configuration mainly specialized to make it difficult to visually recognize the scratches generated on the front surface of the counter substrate. In addition, the related configuration B is a configuration optimized for improving the display quality of the liquid crystal display device provided with the back surface ITO. Therefore, the related configuration B cannot achieve that the opening outline is made sufficiently difficult to be visually recognized.

Hereinafter, the liquid crystal display device including a liquid crystal panel of the lateral electric field drive system provided with a back surface ITO and a protective plate provided with a black pattern (light shielding film) is also referred to as "liquid crystal display device N". From the description of the related configurations A and B above, no effective configuration that can make the opening outline sufficiently difficult to be visually recognized has been proposed so far in the liquid crystal display device N.

Thus, the liquid crystal display device 100 of the first preferred embodiment has a configuration for achieving the above-described effect. Therefore, the above problem can be solved by the liquid crystal display device 100 of the first preferred embodiment.

It should be noted that in the present invention, the preferred embodiment can be appropriately modified and omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:
1. A liquid crystal display device comprising:
a liquid crystal panel of a lateral electric field drive system having a display surface being a surface on a viewing side; and
a transparent protective member configured to cover the display surface of the liquid crystal panel,
wherein the liquid crystal panel includes:
an array substrate; and
a counter substrate being a substrate on a viewing side, the counter substrate configured to face the array substrate,
a liquid crystal layer is sandwiched between the counter substrate and the array substrate,
the counter substrate has an outer front surface being a surface on a viewing side,
the liquid crystal panel further includes:
a laminated film provided on the outer front surface of the counter substrate; and
a transparent conductive film provided on the laminated film,
the transparent conductive film exists on the display surface side of the liquid crystal panel, in the liquid crystal panel, a display region on which an image is displayed exists on the display surface side of the liquid crystal panel,
a light shielding film having an opening is provided in a rim portion of a surface covering the display surface of the transparent protective member,
the transparent protective member is stuck to the display surface of the liquid crystal panel via a transparent adhesive material,
in a plan view, the transparent conductive film covers the display region,
in a plan view, the transparent conductive film overlaps an outline of the opening of the light shielding film provided in the transparent protective member,
the opening is configured so that external light can reach the display region through the opening,
the laminated film as a lower layer of the transparent conductive film includes:
a first low refractive index layer made of a first material having a refractive index of light in a range of 1.4 to 1.6;
a first high refractive index layer made of a second material having a refractive index of light in a range of 1.9 to 2.1;
a second low refractive index layer made of the first material; and
a second high refractive index layer made of the second material, and
in a direction from the transparent conductive film toward the counter substrate, the first low refractive index layer, the first high refractive index layer, the second low refractive index layer, and the second high refractive index layer are provided to exist in order of the first low refractive index layer, the first high refractive index layer, the second low refractive index layer, and the second high refractive index layer.

2. The liquid crystal display device according to claim 1, wherein
each of the first low refractive index layer and the second low refractive index layer is a film made of silicon dioxide, and
each of the first high refractive index layer and the second high refractive index layer is another transparent conductive film.

3. The liquid crystal display device according to claim 1, wherein sheet resistance of the transparent conductive film is in a range of 100Ω/□ to 300 Ω/□.

4. The liquid crystal display device according to claim 1, wherein a film thickness of the transparent conductive film is in a range of 10 nm to 30 nm.

5. The liquid crystal display device according to claim 1, wherein
a film thickness of the first low refractive index layer is in a range of 30 nm to 65 nm,
a film thickness of the first high refractive index layer is in a range of 25 nm to 80 nm,
a film thickness of the second low refractive index layer is in a range of 15 nm to 60 nm, and
a film thickness of the second high refractive index layer is in a range of 10 nm to 30 nm.

* * * * *